(12) United States Patent
Karri et al.

(10) Patent No.: US 10,992,360 B2
(45) Date of Patent: Apr. 27, 2021

(54) FEEDBACK OVERHEAD REDUCTION FOR PRECODERS UNDER HIGH RANK SPATIAL CHANNELS

(71) Applicant: Apple Inc., Cupertino, CA (US)

(72) Inventors: Sai Sravan Bharadwaj Karri, Morgan Hill, CA (US); Swaminathan Balakrishnan, San Jose, CA (US); Junsung Lim, San Jose, CA (US); Haitong Sun, Irvine, CA (US); Johnson O. Sebeni, Fremont, CA (US); Faraz Faheem, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/743,459

(22) Filed: Jan. 15, 2020

(65) Prior Publication Data
US 2020/0244331 A1    Jul. 30, 2020

Related U.S. Application Data

(60) Provisional application No. 62/797,507, filed on Jan. 28, 2019.

(51) Int. Cl.
*H04B 7/06* (2006.01)
*H04B 7/0417* (2017.01)
*H04B 7/0456* (2017.01)

(52) U.S. Cl.
CPC ......... *H04B 7/0658* (2013.01); *H04B 7/0417* (2013.01); *H04B 7/0473* (2013.01); *H04B 7/0626* (2013.01)

(58) Field of Classification Search
CPC .. H04B 7/0658; H04B 7/0417; H04B 7/0473; H04B 7/0626
See application file for complete search history.

(56) References Cited

U.S. PATENT DOCUMENTS

| | | | |
|---|---|---|---|
| 8,995,400 B2 | 3/2015 | Geirhofer | |
| 9,397,796 B2 | 7/2016 | Papasakellariou | |
| 9,537,552 B2 | 1/2017 | Li | |
| 2014/0177747 A1* | 6/2014 | Ruiz Delgado | H04L 5/0053 375/267 |
| 2017/0288751 A1* | 10/2017 | Faxer | H04B 7/0478 |

(Continued)

FOREIGN PATENT DOCUMENTS

| | | |
|---|---|---|
| WO | WO2011098670 A1 | 8/2011 |
| WO | WO2016073039 A1 | 5/2016 |
| WO | WO2018175721 A1 | 9/2018 |

OTHER PUBLICATIONS

Candes, Emmanuel, et al., "Robust Uncertainty Principles: Exact Signal Reconstruction from Highly Incomplete Frequency Information", Jun. 10, 2004, 39 pages.

(Continued)

*Primary Examiner* — Ted M Wang
(74) *Attorney, Agent, or Firm* — Kowert, Hood, Munyon, Rankin & Goetzel, P.C.

(57) ABSTRACT

Apparatuses, systems, and methods for a wireless device to encode channel state information (CSI), e.g., enhanced type II CSI. A common frequency basis may be selected. Spatial-frequency coefficients, frequency basis related information, and/or spatial basis related information may be determined. At least a portion of the coefficients and/or information may be encoded in a CSI report.

20 Claims, 18 Drawing Sheets

(56) References Cited

U.S. PATENT DOCUMENTS

2019/0207662 A1    7/2019  Zhou
2019/0215897 A1    7/2019  Babaei
2019/0254047 A1    8/2019  Ahmed
2019/0260434 A1    8/2019  Park
2019/0312623 A1*  10/2019  Park .................... H04B 7/0456

OTHER PUBLICATIONS

Kunis, Stefan and Rauhut, Holger, "Random Sampling of Sparse Trigonometric Polynomials II—Orthogonal Matching Pursuit versus Basis Pursuit", Apr. 19, 2006; revised Nov. 4, 2018, 24 pages.

* cited by examiner

| Number of CSI-RS Ports | $(N_1, N_2)$ | $(O_1, O_2)$ |
|---|---|---|
| 4 | (2,1) | (4,-) |
| 8 | (2,2) | (4,4) |
|   | (4,1) | (4,-) |
| 12 | (3,2) | (4,4) |
|   | (6,1) | (4,-) |
| 16 | (4,2) | (4,4) |
|   | (8,1) | (4,-) |
| 24 | (6,2), (4,3) | (4,4) |
|   | (12,1) | (4,-) |
| 32 | (8,2), (4,4) | (4,4) |
|   | (16,1) | (4,-) |

$$W^1_{q_1,q_2,n_1,n_2,p_1^{(1)},p_1^{(2)},c_1} = \sqrt{\dfrac{1}{N_1 N_2 \sum_{i=0}^{2L-1}(p_{1,i}^{(1)}p_{1,i}^{(2)})^2}} \left[ \begin{array}{c} \sum_{i=0}^{L-1} v_{m_1^{(i)},m_2^{(i)}} p_{1,i}^{(1)} p_{1,i}^{(2)} \varphi_{1,i} \\ \sum_{i=0}^{L-1} v_{m_1^{(i)},m_2^{(i)}} p_{1,i}^{(1)} p_{1,i+L}^{(2)} \varphi_{1,i+L} \end{array} \right],$$

Beam Indices • Up to L={2,3,4} Beams • DFT Beams • WB Amplitude • SB Amplitude • SB Phase • V-Pol • H-Pol

FIG. 12

$$W^1_{q_1,q_2,n_1,n_2,p_1^{(1)},p_1^{(2)},c_1} = \left[ \begin{array}{c} \sum_{i=0}^{L-1} v_{m_1^{(i)},m_2^{(i)}} p_{1,i}^{(1)} p_{1,i}^{(2)} \varphi_{1,i} \\ \sum_{i=0}^{L-1} v_{m_1^{(i)},m_2^{(i)}} p_{1,i}^{(1)} p_{1,i+L}^{(2)} \varphi_{1,i+L} \end{array} \right] \cdot \frac{1}{\sqrt{N_1 N_2 \sum_{i=0}^{2L-1} (p_{1,i}^{(1)} p_{1,i}^{(2)})^2}}$$

Rank 1 →

$(N1,N2)=4,4$ $(Q1,82=(4,4)$ $Z=3$ 8PSK for K Leading Coefficients

| Rank | L (Number of beams per layer) | Rotation Log2 (O1O2) | L-beam Selection | Strongest Coff. Log2 (2L) | WBAmp 3*(2L-1) | Total WB Payload | SB Amp 1*K-1 Per Layer | SB Phase (1SB) Z*(K-1)+2*(2L-K) | Total Payload (WB + 10 SBs) / PUCCH Report |
|---|---|---|---|---|---|---|---|---|---|
| 1 | 2 | 4 | 8 | 2 | 9 | 23 | 3 | 9 | 143 |
| 1 | 3 | 4 | 12 | 3 | 15 | 34 | 3 | 13 | 194 |
| 1 | 4 | 4 | 16 | 3 | 21 | 44 | 5 | 19 | 284 |

| Layers | |
|---|---|
| $v=1$ | $W^{(1)}_{q_1,q_2,n_1,n_2,p_1^{(1)},p_1^{(2)},i_{2,1,1}} = W^1_{q_1,q_2,n_1,n_2,p_1^{(1)},p_1^{(2)},i_{2,1,1}}$ |
| $v=2$ | $W^{(2)}_{q_1,q_2,n_1,n_2,p_1^{(1)},p_1^{(2)},p_2^{(1)},p_2^{(2)},i_{2,1,1},i_{2,1,2}} = \frac{1}{\sqrt{2}}\begin{bmatrix} W^1_{q_1,q_2,n_1,n_2,p_1^{(1)},p_1^{(2)},i_{2,1,1}} & W^2_{q_1,q_2,n_1,n_2,p_1^{(2)},p_1^{(2)},i_{2,1,2}} \end{bmatrix}$ |

| Rank | L (Number of beams per layer) | Rotation Log2 (O1O2) | L-beam Selection | Strongest Coff.Log2 (2L) | WBAmp 3*(2L-1) | Total WB Payload | SB Amp 1*K-1 Per Layer | SB Phase (1SB) Z*(K-1)+2*(2L-K) | Total Payload (WB + 10 SBs) / PUCCH Report |
|---|---|---|---|---|---|---|---|---|---|
| 1 | 2 | 4 | 8  | 2 | 9  | 23 | 3  | 9  | 143 |
| 1 | 3 | 4 | 12 | 3 | 15 | 34 | 3  | 13 | 194 |
| 1 | 4 | 4 | 16 | 3 | 21 | 44 | 5  | 19 | 284 |
| 2 | 2 | 4 | 8  | 4 | 18 | 34 | 6  | 18 | 274 |
| 2 | 3 | 4 | 12 | 6 | 30 | 52 | 6  | 26 | 372 |
| 2 | 4 | 4 | 16 | 6 | 42 | 68 | 10 | 38 | 548 |

*FIG. 14*

$(N1, N2) = 4,4 \ (O1, O2) = (4,4)$   $Z=3 \ 8PSK \ for \ K \ Leading \ Coefficients$

| Rank | L (Number of beams per layer) | Rotation Log2 (O1O2) | L-beam Selection | Strongest Coff.Log2 (2L) | WBAmp 3*(2L-1) | Total WB Payload | SB Amp 1*K-1 Per Layer | SB Phase (1SB) Z*(K-1)+2*(2L-K) | Total Payload (WB + 10 SBs) / PUCCH Report |
|---|---|---|---|---|---|---|---|---|---|
| 1 | 2 | 4 | 8 | 2 | 9 | 23 | 3 | 9 | 143 |
| 1 | 3 | 4 | 12 | 3 | 15 | 34 | 3 | 13 | 194 |
| 1 | 4 | 4 | 16 | 3 | 21 | 44 | 5 | 19 | 284 |
| 2 | 2 | 4 | 8 | 4 | 18 | 34 | 6 | 18 | 274 |
| 2 | 3 | 4 | 12 | 6 | 30 | 52 | 6 | 26 | 372 |
| 2 | 4 | 4 | 16 | 6 | 42 | 68 | 10 | 38 | 548 |
| 3 | 2 | 4 | 8 | 6 | 27 | 45 | 9 | 27 | 405 |
| 3 | 3 | 4 | 12 | 9 | 45 | 70 | 9 | 39 | 550 |
| 3 | 4 | 4 | 16 | 9 | 63 | 92 | 15 | 57 | 812 |
| 4 | 2 | 4 | 8 | 8 | 36 | 56 | 12 | 36 | 536 |
| 4 | 3 | 4 | 12 | 12 | 60 | 88 | 12 | 52 | 728 |
| 4 | 4 | 4 | 16 | 12 | 84 | 116 | 20 | 76 | 1076 |

FIG. 15

| Rank | Rank Reported (CSI1 Rank, CSI2 Rank) | Beam Splitting (#CSI1 + #CSI2) | Split CSI Bits (#CSI1 Bits, #CSI2 Bits) | Total Bits with Split CSI | Total Bits Default | Delta (Default-Split) | % Savings in Bits | Beam Layer Splitting (#LayersPMI1, #LayersPMI2) |
|---|---|---|---|---|---|---|---|---|
| 2 | (2,2) | 6+2 | 372+143 | 515 | 548 | 33 | 6.9 | (2,1) |
| 3 | (3,3) | 9+3 | 550+194 | 744 | 812 | 68 | 8.37 | (3,1) |
| 4 | (4,4) | 12+4 | 728+284 | 1012 | 1076 | 64 | 5.94 | (4,1) |

$$\left(\sum_{m=0}^{m=3} c_m^1 \overrightarrow{b_m}, \sum_{m=4}^{m=7} c_m^1 \overrightarrow{b_m}\right)^H \left(\sum_{m=0}^{m=3} c_m^2 \overrightarrow{b_m}, \sum_{m=4}^{m=7} c_m^2 \overrightarrow{b_m}\right) = 0$$

FIG. 21

| Rank | Wideband Payload (all layers) | First Layer (subband coeff only) | Second Layer (subband coeff only) | Third Layer (subband coeff only) | Fourth Layer (subband coeff only) | Total | Spec (4 beams per layer) | % Savings |
|---|---|---|---|---|---|---|---|---|
| 2 | 68 | 240 | 200 | NA | NA | 508.0 | 548 | 7.30 |
| 3 | 92 | 240 | 200 | 160 | NA | 692.0 | 812 | 14.78 |
| 4 | 116 | 240 | 200 | 160 | 120 | 836.0 | 1076 | 22.30 |

FIG. 22

FEEDBACK OVERHEAD REDUCTION FOR PRECODERS UNDER HIGH RANK SPATIAL CHANNELS

PRIORITY CLAIM

This application claims priority to U.S. provisional patent application Ser. No. 62/797,507, entitled "Feedback Overhead Reduction for Precoders under High Rank Spatial Channels", filed Jan. 28, 2019, which is hereby incorporated by reference in its entirety as though fully and completely set forth herein.

FIELD

The present application relates to wireless devices, and more particularly to apparatus, systems, and methods for a wireless device to encode channel state information.

DESCRIPTION OF THE RELATED ART

Wireless communication systems are rapidly growing in usage. Further, wireless communication technology has evolved from voice-only communications to also include the transmission of data, such as Internet and multimedia content. Enhanced channel state information (CSI) is important to support features such as beam forming and multiple-in-multiple out (MIMO), including multi-user MIMO (MU-MIMO). However, such enhanced CSI may increase signaling overhead. Thus, improvements in the field are desired.

SUMMARY

Embodiments relate to apparatuses, systems, and methods to perform encoding of channel state information (CSI), e.g., enhanced type II CSI. Embodiments may reduce the signaling overhead associated with CSI reporting, e.g., for multiple-in-multiple-out (MIMO), including multi-user MIMO (MU-MIMO), communications. In some embodiments, CSI may be encoded using one or more of: beam splitting, layer puncturing across orthogonal layers, and/or randomized subband (SB) compression.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 11 and 12 illustrate type II CSI precoding, according to some embodiments;

FIGS. 13 and 14 illustrate type II CSI reporting with ranks 1 and 2, according to some embodiments;

FIG. 15 illustrates type II CSI reporting up to rank 4, according to some embodiments;

FIGS. 19-22 illustrate type II CSI precoding overhead reduction via layer puncturing across orthogonal layers, according to some embodiments.

Figure 1:
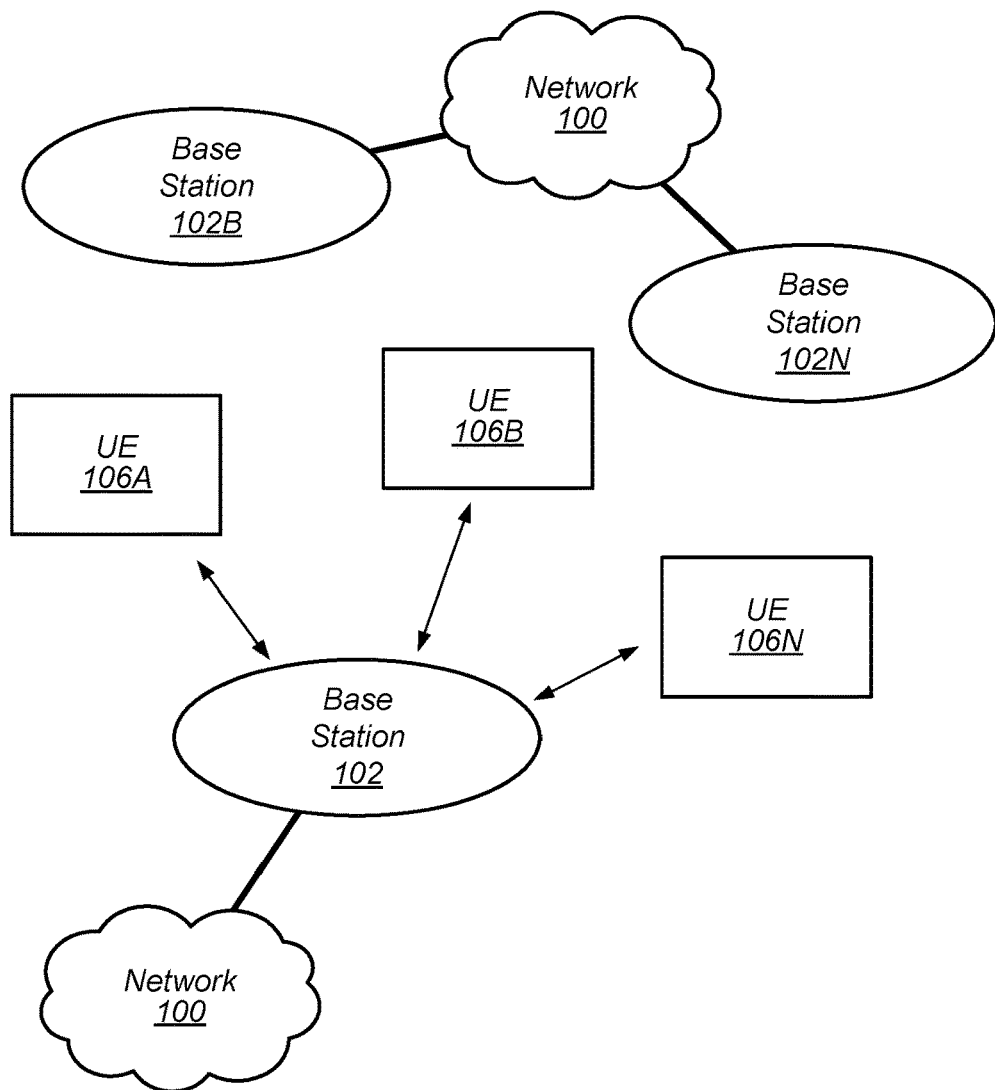
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Acronyms

Figure 2:
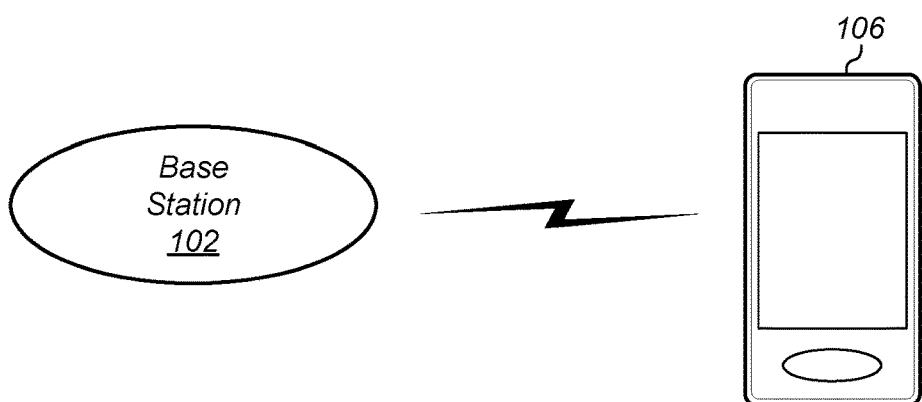
FIG. 2 illustrates a base station (BS) in communication with a user equipment (UE) device, according to some embodiments.

CSI: channel state information
PMI: precoding matrix indicator
RI: rank indicator
CQI: channel quality indicator
UCI: uplink control information
RS: reference signal
DFT: discrete Fourier transform
WB: wideband
SB: subband
SVD: singular value decomposition FIGS. 1 and 2—Communication System FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
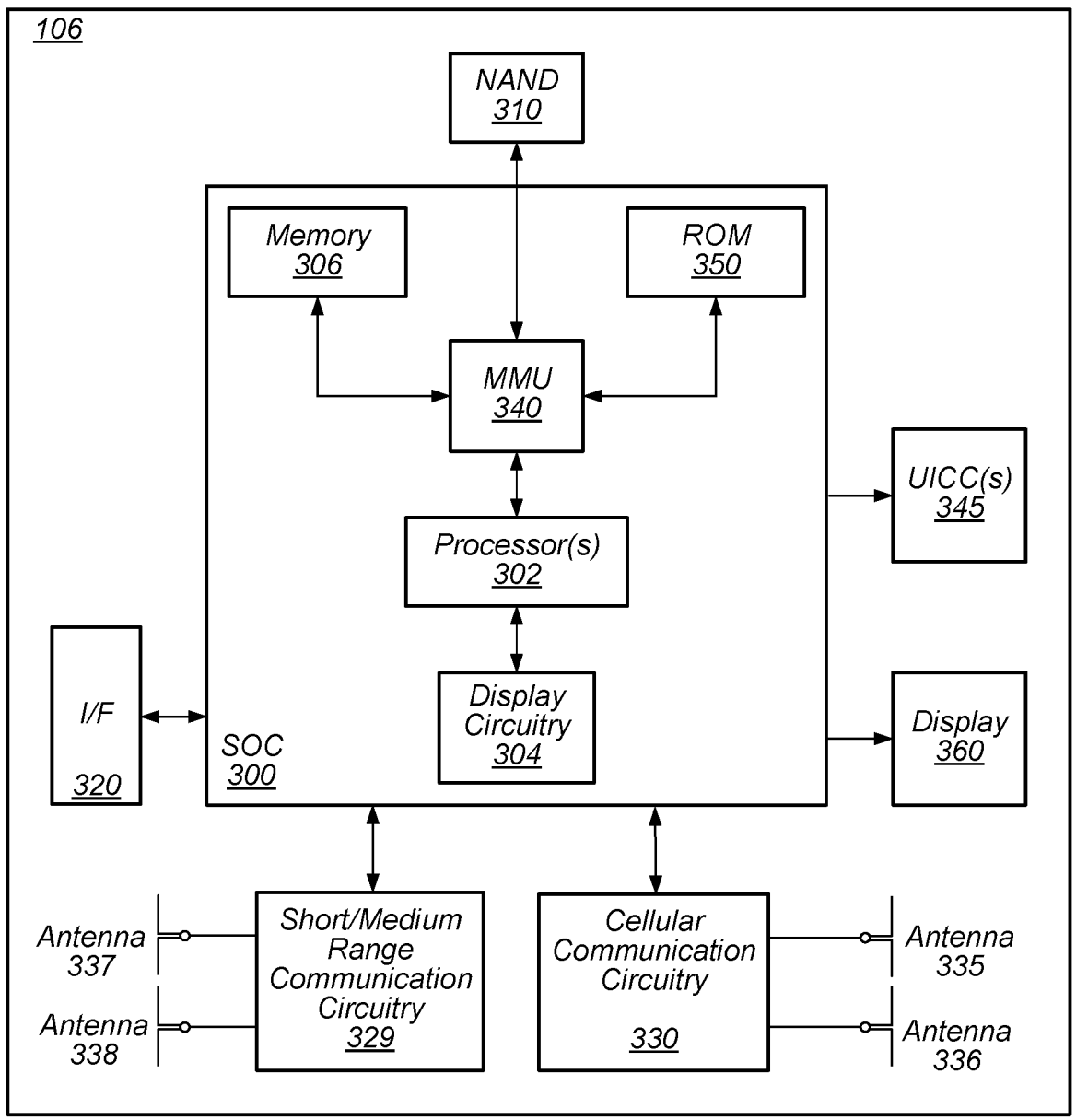
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using RRC multiplexing to perform transmissions according to multiple radio access technologies in the same frequency carrier, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
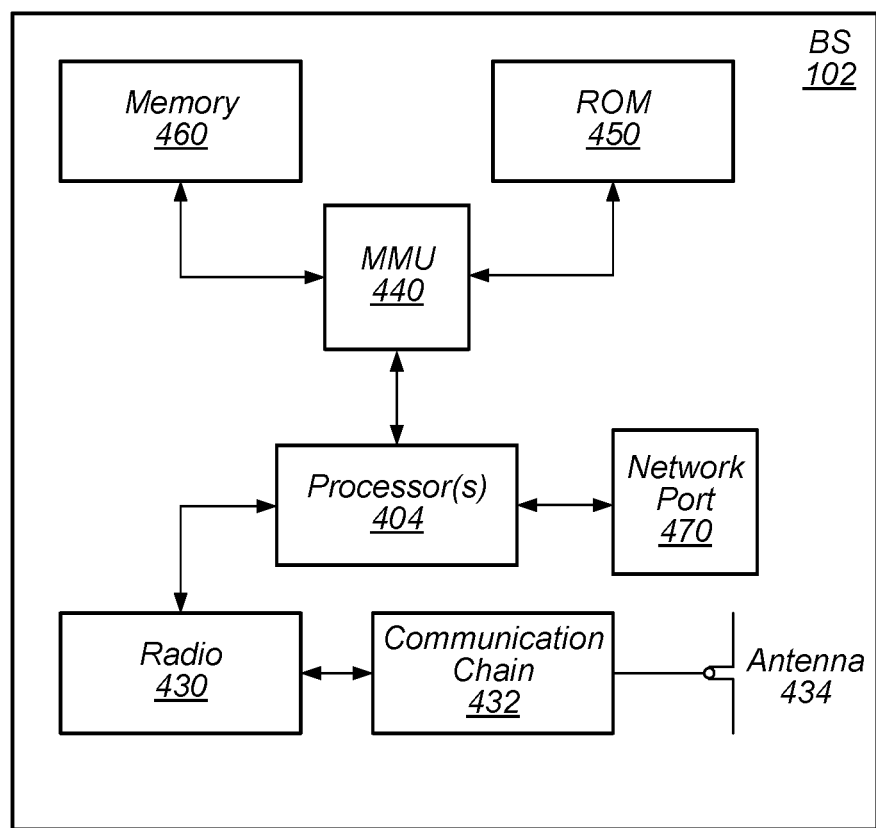
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
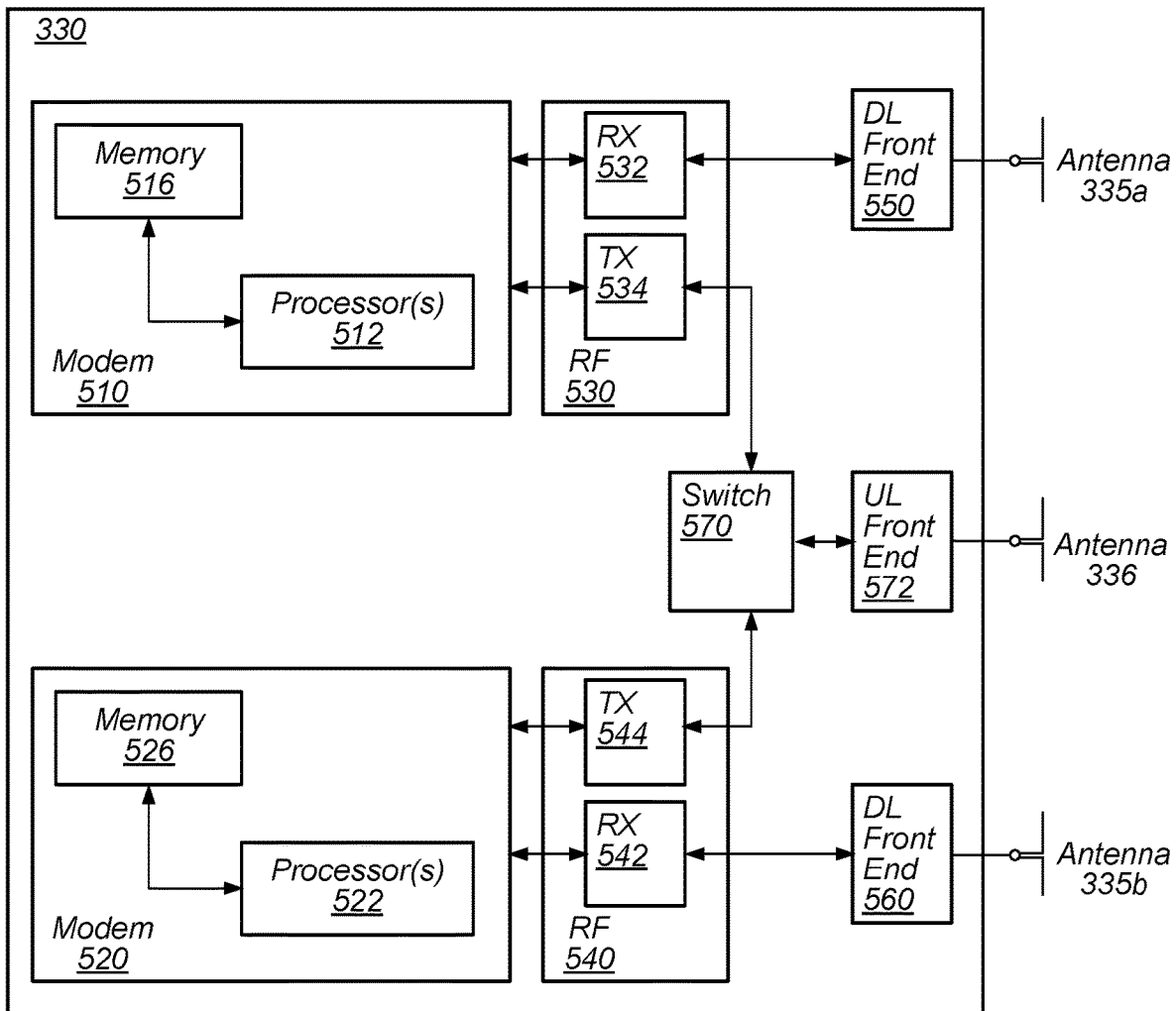
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using RRC multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for using RRC multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
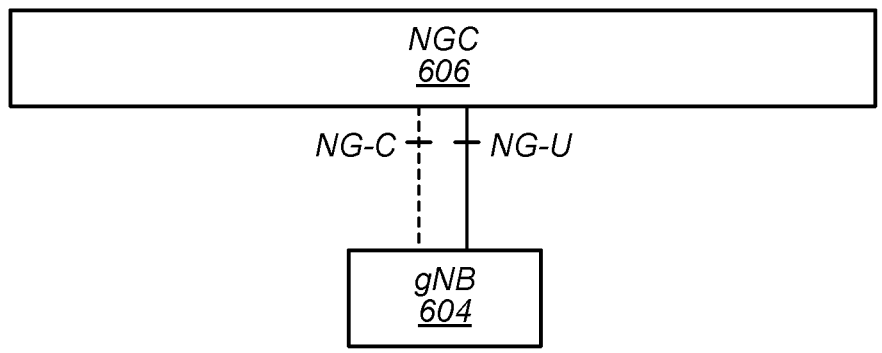
FIGS. 6 and 7 illustrate examples of a 5G NR base station (gNB) and associated network architecture, according to some embodiments.
Figure 7:
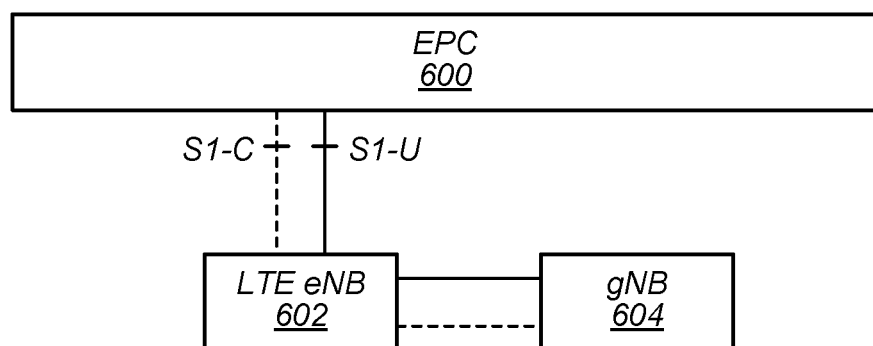

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
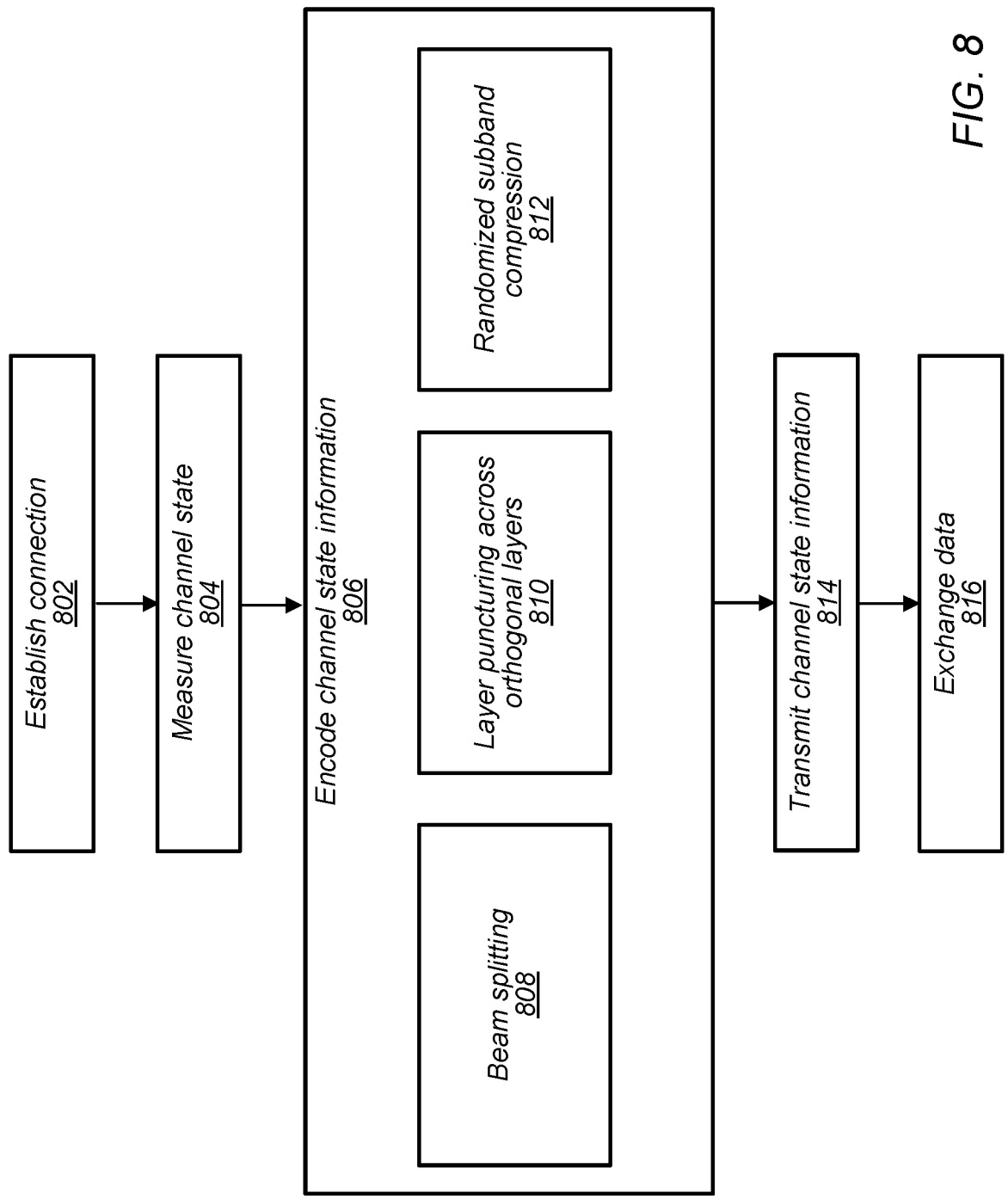
FIG. 8 illustrates techniques for encoding CSI with reduced overhead, according to some embodiments.

FIG. 8—CSI Encoding with Reduced Overhead

As noted above, a UE 106 and BS 102 may each include any number of antennas/ports and may be configured to use the antennas to transmit and/or receive directional wireless signals (e.g., beams). To receive and/or transmit such directional signals, the antennas of the UE 106 and/or BS 102 may be configured to apply different "weights" to different antennas. The process of applying these different weights may be referred to as "precoding".

Channel state information (CSI) may refer to the properties of a wireless channel, e.g., between a UE 106 and BS 102. CSI may be estimated (e.g., in the downlink direction) by the UE 106 and reported back to the BS 102. CSI may be reported, at least in part via a precoding matrix indicator (PMI). The BS 102 may then use the CSI (e.g., potentially multiple PMIs) for precoding.

NR release 15 includes Type I and Type II CSI. Type II CSI may include both wideband (WB) and subband (SB)-specific information, e.g., for each layer and for each polarization. Amplitude coefficients may be reported for both WB and SB. With Type II CSI, the (e.g., SB-specific) precoding weights for a layer may be represented by a linear combination of a set of discrete Fourier transform (DFT) vectors (e.g., beams). The vectors may be 2-dimensional fast Fourier transform (FFT) based. In addition to amplitude coefficients, SB-specific phase coefficients may be reported for each beam, layer, and polarization. The linear combination coefficients in a Type II CSI may be element-wise quantized for each SB and for each polarization. Thus, Type II CSI may require large amounts of signaling overhead, e.g., to enumerate a potentially large number of SB-specific combination coefficients in the precoding vector.

A Type II precoder using linear combination of beams has been proposed for adoption in 3GPP standards for MU-MIMO. The UE feedback for the precoder may involve a linear combination of beams and may include both WB and SB amplitude coefficients as well as phase information. Currently 3GPP standards may support rank 1 and rank 2. The Type II CSI's large payload may demand high payload overhead, e.g., including sufficient resources from a gNB.

For each layer, the precoding vector may be a linear combination of a number (L) of DFT vectors, e.g., beams. A wireless device (e.g., UE) may select a 2D beam basis set for a CSI report along horizontal and vertical polarizations. The length of each DFT vector/beam may correspond to the size of the array of antennas (e.g., an array of $N_1$ by $N_2$ antennas may imply DFT vectors of length $N_1 N_2$ (e.g., $N_1 * N_2$)). The DFT vectors may be common for all SBs. For example, the (L) DFT vectors may be block diagonal matrix which may be multiplied by a column of SB-specific combination coefficients.

WB PMI may encode various information, including rotation in each spatial dimension, indices of the (L) spatial basis, a strongest coefficient for each layer, and a WB amplitude for each layer. SB PMI may include SB phase and (e.g., if configured) SB amplitude. The number of non-zero coefficients may determine the number of bits of PMI for each SB.

Frequency compression may be applied to reduce overhead. For example, if the channel is less frequency-selective, neighboring coefficients may exhibit similarity (e.g., SB-specific coefficients may be correlated). Therefore, overhead may be reduced by compression in the frequency dimension, e.g., by compressing coefficients of a number (N) of SBs to a smaller number (K) of frequency basis (which may also be referred to as "taps"). This may be referred to as a K DFT basis.

An aggregation of precoding vectors may be expressed as a matrix. The matrix may be equal to a product of a matrix of the L DFT vectors (e.g., the spatial basis or "beams")

multiplied by a block diagonal matrix of the compressed combination coefficients multiplied by the K frequency basis.

Notwithstanding the above techniques, the size of a (e.g., Type II) CSI report may be quite large. For example, due to the number of antennas/beams and SBs, the number of SB-specific coefficients may be large (e.g., even after frequency compression). Accordingly, further techniques for reducing CSI overhead may be desired.

Some embodiments may reduce this payload and resource need. While a UE may send a full CSI report (e.g., a full precoder) to the gnB (or BS 102), it may also send a partial CSI report containing the data required for precoder construction at the gnB. The gnB may do some additional processing to reconstruct the precoder. Thus, the following approaches and embodiments may present a tradeoff between additional processing and overhead reduction. Briefly, embodiments may include any or all of: beam splitting across time domain, layer wise puncturing with reconstruction at the gnB, and/or randomized SB compression with simple convex optimization the gnB. In some embodiments, overhead reduction schemes may be traded off with increase in complexity at the gnB.

FIG. 8 illustrates exemplary techniques for reducing overhead in CSI encoding, e.g., particularly for higher numbers of layers relative to techniques employed in NR release 15. Embodiments described herein may include reducing overhead via any combination of beam splitting, layer puncturing across orthogonal layers, and/or random SB compression. Aspects of the method of FIG. 8 may be implemented by a wireless device, such as the UEs 106, in communication with one or more base station (e.g., BS 102) as illustrated in and described with respect to the Figures, or more generally in conjunction with any of the computer systems or devices shown in the Figures, among other devices, as desired. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. Similarly, although some elements of the method are described in a manner relating to the measurement and reporting of a downlink channel (e.g., by a UE reporting to a base station), the method may also be applied in the reverse (e.g., a base station measuring an uplink channel). Further, the method may be applied in other contexts (e.g., between multiple UEs, e.g., in device-to-device communications). In various embodiments, some of the elements of the methods shown may be performed concurrently, in a different order than shown, may be substituted for by other method elements, or may be omitted. Additional method elements may also be performed as desired. As shown, the method may operate as follows.

A wireless device (e.g., UE 106) may establish communication with a base station (e.g., BS 102) (802), according to some embodiments. The UE 106 and BS 102 may communicate according to one or more wireless standards (e.g., NR, among various possibilities) and may exchange application data and/or control information in the uplink and/or downlink directions. The connection between the UE 106 and BS 102 may use multiple-in-multiple out (MIMO), including multi-user MIMO (MU-MIMO). The communication may use any number of bands and/or SBs, e.g., including licensed and/or unlicensed frequencies. The communication may use any number of antennas/ports at the UE 106 and/or BS 102. The UE 106 and/or BS 102 may use beamforming techniques and may weight the various antennas differently, e.g., to transmit and/or receive any number of beams, e.g., in various directions.

The BS 102 may provide control information to the UE, according to some embodiments. The control information may specify configuration parameters for measuring and reporting channel state information (CSI). For example, the configuration parameters may include timing of measurements and/or reports, frequencies (e.g., bands and/or SBs) to measure and/or report, beams to measure and/or report, techniques to apply for reporting CSI (e.g., potentially including one or more of: beam splitting, layer puncturing across orthogonal layers, random SB compression, and/or full reporting, among various possibilities), etc. The control information may indicate that the UE should report spatial basis amplitude, frequency basis amplitude, or both. The control information may be transmitted to the UE via a higher layer such as radio resource control (RRC) and/or media access control (MAC), among various possibilities.

The wireless device (e.g., UE 106) may perform one or more measurements to measure the state of the channel, e.g., according to received control information and/or configuration of the UE (804), according to some embodiments. The measurements may include any radio link measurements, e.g., to support reports such as CSI and/or channel quality indicator (CQI). For example, the measurements may include one or more of: signal-noise ratio (SNR), signal to interference and noise ratio (SINR), reference signal received power (RSRP), reference signal received quality (RSRQ), received signal strength indicator (RSSI), block error rate (BLER), bit error rate (BER), channel impulse response (CIR), channel error response (CER), etc. The measurements may be performed using any number of receive beams (e.g., of the UE 106) and/or transmit beams (e.g., of the BS 102). The measurements may be performed for any number of frequencies (e.g., SB and/or WB measurements). The measurements may be performed using reference signals (RS) (e.g., CSI-RS) transmitted by the BS 102. The measurements may be performed at any time(s), and may utilize hysteresis techniques.

Based on the channel state measurements and any control information, wireless device (e.g., UE 106) may encode CSI, e.g., including the PMI and/or other information (806), according to some embodiments. The CSI may be encoded into one or more CSI reports or incorporated into another report/transmission. Each CSI report may include any number of parts, e.g., fields or bits.

To encode the CSI, the wireless device (e.g., UE 106) may dynamically select one or more technique or method to reduce the overhead associated with transmitting the CSI. Such techniques may include any or all of beam splitting (e.g., across time domain) (808), layer puncturing across orthogonal layers (e.g., layer wise puncturing with reconstruction at gnB) (810), and/or randomized SB compression (e.g., with simple convex optimization gnB) (812), among various possibilities. The UE may determine which (if any) techniques to apply based on one or more of: an indication from the BS (e.g., in control information), configuration of the UE, channel conditions, rank (e.g., current number of layers in use), report size (e.g., of potential reports using the different techniques), motion of the UE (e.g., which may lead to changing channel conditions), activity of the user and/or applications executing on the device (e.g., small report size may be prioritized if activity is low, more detailed/accurate reporting may be prioritized if activity and/or performance requirements are high), etc. For example, at various times and/or under various circumstances, a UE may select different combinations of techniques, e.g., including to transmit full CSI reports without applying any of beam splitting, layer puncturing, or SB compression. For example, at a first time (e.g., at a first frequency/periodicity) a UE may transmit one or more CSI reports using a technique for reducing overhead, and at a second time (e.g., at a lower frequency or longer periodicity) the UE may transmit a report with full PMI.

Beam splitting, as explained in more detail below with regard to FIGS. 17-18, may include dividing CSI into any number of reports, e.g., which may be transmitted at different times. The various reports may include complementary portions of the CSI, e.g., a first report may include a first subset of coefficients and a second report may include a second, complementary, subset of coefficients. For example, a first report may include information about all layers at a lower level of detail and a second report may include information about a single layer at a higher level of detail. As a second example a first report may include a first subset of beams and a second report may include a second subset of beams. In some embodiments, more than two reports may be used. Beam splitting may not rely on additional processing at the BS to the same degree as the other techniques (e.g., layer puncturing, randomized SB compression), but may offer comparatively lower benefits in terms of overhead reduction, according to some embodiments.

Layer puncturing across orthogonal layers, as explained in more detail below with regard to FIGS. 19-22, may include omitting coefficients for a number of beams from a CSI report (e.g., for all SBs). The receiver may determine the values of the omitted coefficients using mathematical properties of the precoder, e.g., orthogonality. Coefficients for increasing numbers of beams may be omitted for each layer.

Randomized SB compression as explained in more detail below with regard to FIG. 23, may include selecting a random subset of SBs for reporting. The size of the random subset of SBs may be based on time domain support as indicated by channel impulse response (CIR) and/or channel energy response (CER), among various possibilities. The receiver may determine the coefficients (e.g., for SBs that are excluded) using convex optimization techniques.

Any combination of the illustrated techniques may be applied together (e.g., in any order). For example, layer puncturing may be applied to omit coefficients of some beams (e.g., across all SBs) from the report. Then, SB compression may be further applied to omit coefficients (e.g., for all beams) for some SBs from the report.

The wireless device (e.g., UE 106) may transmit the CSI to the BS 102 (814), according to some embodiments. The CSI may be transmitted on a shared and/or control channel. The CSI report(s) may be periodic or aperiodic. The report(s) may be transmitted alone or with additional control information, measurement reports, and/or application data.

The BS 102 may receive and decode the CSI report(s). The BS may interpret the CSI reports in view of the applied technique(s) for reducing overhead. In other words, the BS may reconstruct any omitted coefficients according to the mathematical techniques described herein.

The wireless device (e.g., UE 106) may exchange data with the BS 102 (816), according to some embodiments. One or both of the UE 106 and BS 102 may use precoding to exchange data, e.g., according to the CSI, among various possibilities. The exchange of data may include control information and/or application data. The control information may specify use (e.g., by the UE 106 and/or BS 102) of precoding according to the CSI report. Control information specifying configurations for future CSI reports may be included. Such future CSI reports may use the same or different techniques for encoding CSI.

Figures 9, 10:
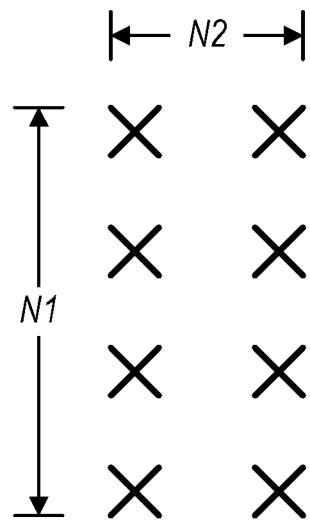
FIG. 9 illustrates an exemplary antenna array layout, according to some embodiments.
FIG. 10 illustrates a table of ports, antenna layouts, and oversampling rates, according to some embodiments.

FIG. 9—Antenna Array Layout

FIG. 9 illustrates the layout of an exemplary array of antennas, according to some embodiments. $N_1$ and $N_2$ may refer to the number of antennas in each of two respective dimensions. As shown, the exemplary array is a two-dimensional array consisting of a 4 by 2 grid (e.g., $N_1=4$, $N_2=2$). Thus, the exemplary array includes 8 antennas (e.g., $N_1*N_2=8$). The number of DFT vectors may be configured (e.g., by a BS) based on the values of $N_1$ and $N_2$ or separately from the values of $N_1$ and $N_2$. In some embodiments, the total number of antennas may range from 4 to 8, although other numbers of antennas are possible according to various embodiments. Further, the array may include different numbers of dimensions (e.g., one or 3 dimensions, etc.). Similarly, the antennas may be arranged in other patterns (e.g., concentric circles, etc.). An antenna array (e.g., of $N_1$ and $N_2$) may be able to receive, transmit, and or report on a number of beams, L, e.g., as a linear combination.

FIG. 10—Table of Ports, Antenna Layouts, and Oversampling Rates

FIG. 10 illustrates various possible combinations of number of ports (e.g., for CSI-RS, e.g., a number of antennas), antenna layouts, and oversampling rates, according to some embodiments. Such combinations may be useful for Type II CSI feedback, e.g., high-resolution CSI such as MU-MIMO and rank greater than or equal to 2, e.g., for millimeter wave (mmWave) communications. The FFT oversampling rate may be expressed in two dimensions corresponding to $N_1$ and $N_2$, e.g., $(O_1, O_2)$.

Figure 11:
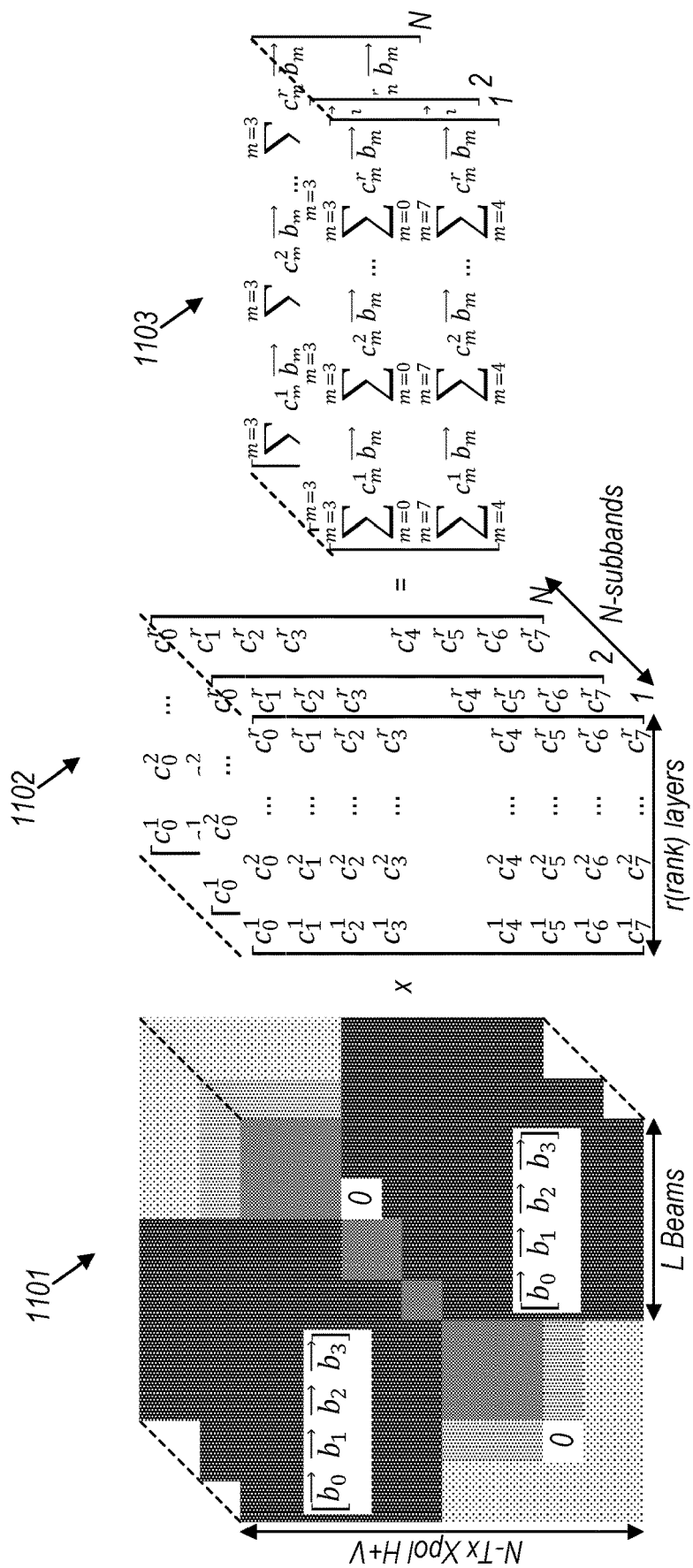

FIGS. 11 and 12—Type II CSI Precoding

FIG. 11 illustrates a precoder for type II CSI, e.g., utilizing sounding reference signal (SRS) based channel estimation for reduced beam feedback. It will be appreciated that various types of RS may be used, e.g., SRS, CSI-RS, etc. An antenna array may be able to receive, transmit, and or report on a number of beams, L, e.g., as a linear combination of beams $b_0$ to $b_3$ in the illustrated example. The phase combinations may be represented by phase shift keying (e.g., nPSK). For type II CSI reporting, SB amplitude may be either on or off, e.g., may or may not be reported in CSI. Rank (e.g., number of layers) may be indicated by rank indicator (RI).

As shown, a first matrix (1101) representing beams $b_0$ to $b_3$ across the horizontal (H) and vertical (V) polarizations may be multiplied by a second matrix (1102). The second matrix may include coefficients ($c_m^r$) for each layer (r), SB, and beam (indexed by m, illustrated in the vertical dimension so that m=0-3 or a first polarization and m=4-7 for the second polarization). The third matrix (1103) illustrates the summation of the coefficients multiplied by the beams, e.g., the product of the first two matrices.

FIG. 12 further illustrates precoding for type II CSI. A basic concept of Type II CSI feedback may be the linear combination of beams (e.g., DFT beams). For each layer, up to 4 component beams (e.g., 2D FFT based) may be selected and the amplitude coefficients (e.g., WB and SB) and the phase coefficient (SB) for each selected beam, each layer and each polarization may be reported.

In some embodiments, the UE may report all coefficients $c_m^r$ for all beams, layers, and SBs. The coefficients may be further reported as WB amplitude ($p^{(1)}$), SB amplitude ($p^{(2)}$), and SB phase $\varphi$.

FIGS. 13-16 Type II CSI Reporting

FIG. 13 illustrates Type II CSI reporting with rank 1, according to some embodiments. A UE may select a 2D beam basis set for CSI reporting along horizontal and vertical polarizations. The UE may report different beam coefficients, WB and/or SB amplitudes, and/or phase coefficients (SB) for each selected beam per each layer and polarization. The table (1301) shows the number of bits (except for the first two columns, which illustrate rank and number of beams per layer, respectively) that may be used to indicate the precoding parameter of the column. Arrows indicate how the bits correspond to the mathematical representation of the precoder (e.g., similar to the illustration of FIG. 12).

As illustrated in the first row of the table 1301, the total WB payload may be 23 bits, in the illustrated example. This 23 bits may be the sum of the bits for rotation (4), beam selection (8), strongest coefficient (2), and WB amplitude (9). The total payload in this row may be the sum of the WB payload (23) and the SB payload per SB times the number of SBs. In the illustrated example, the payload per SB is SB amplitude (3) plus SB phase (9), and there are 10 SBs. Thus, there are 12 bits for each of 10 SBs, for 120 bits for SB payload and 143 bits of total payload.

In some embodiments, the type II CSI reports may contain same L beams for horizontal and vertical polarizations selected from a set of $N_1*N_2$ orthogonal beams. Further over sampling by $O_1$ and $O_2$ may increase the resolution of the beams. So the 2L (L vertical and L horizontal beams) may be weighted by 2L wideband amplitudes ($p_{li}$ in FIG. 13) cascaded with SB amplitude and phase coefficients. The beam with the highest amplitude coefficient may be weighted by factor of 1 implicitly and rest of (2L−1) beams may be weighted by 3 bits for Wideband and 1 bit for SB amplitude for L−1 beams. 2 bit Phase coefficients may be allocated for 2L beams per SB.

FIG. 14 illustrates type II CSI reporting with rank 1 and 2, according to some embodiments. When the number of layers is increased to 2, the whole configuration (e.g., of FIG. 13) may be repeated for another layer. For example, the same beams may be chosen for the second layer as well. A UE may select the same beam basis set for all layers per CSI report along horizontal and vertical polarizations. The UE may report different beam coefficients, WB amplitudes, SB amplitudes, and phase coefficients (SB) for each selected beam per each layer and polarization. Accordingly, each layer may add a column to the precoder, as illustrated. Note that the bit size of most columns in the table may double from rank 1 to rank 2 (for a given number of layers). However, some fields (e.g., rotation and beam selection) may not be changed by the rank. Thus, the SB payload may scale with rank and some of the fields of the WB payload may scale with rank. In other words, the SB feedback may double owing to the (e.g., doubled) number of layers. This approach may extend to higher ranks as shown in FIG. 15, and the overhead required for rank 3 and rank 4 transmissions may be as shown.

FIG. 15 illustrates type II CSI reporting with rank 1-4, according to some embodiments. FIG. 15 illustrates the bit size that would be needed to extend the techniques of FIGS. 13 and 14 to ranks 3 and 4 using the same values of L, e.g., L={2,3,4} beams.

Figures 16, 17:
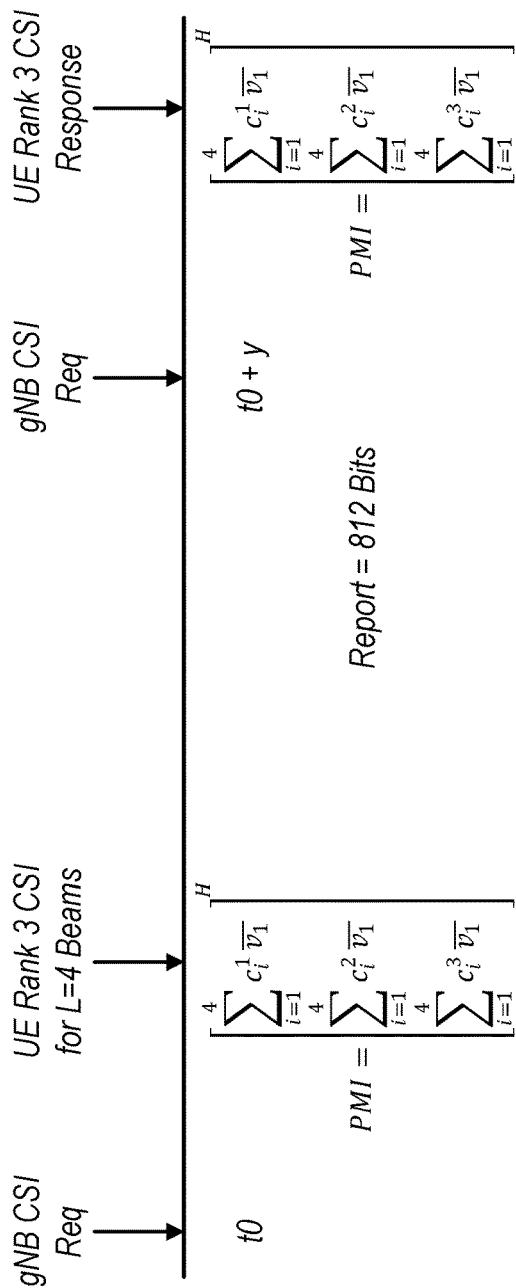
FIG. 16 illustrates type II CSI reporting over time, according to some embodiments.
FIG. 17 illustrates type II CSI precoding overhead reduction via beam splitting, according to some embodiments.

FIG. 16 illustrates type II CSI reporting over time, according to some embodiments. As illustrated, at a first time (t0) a base station (gNB) may transmit a CSI request. At a second time, the UE may respond by transmitting a first CSI report. In the illustrated example, the first report may be based on rank 3 with L=4 beams. At a third time (t0+y), the base station (gNB) may transmit a second CSI request. At a fourth time, the UE may respond by transmitting a second CSI report. In the illustrated example, the second report may be based on rank 3 with L=4 beams. It should be noted that, although the parameters of the first and second report are the same in the illustrated example, the parameters (e.g., rank, number of beams, etc.) may vary between reports. Each of the reports may be 812 bits, among various possibilities.

Figure 18:
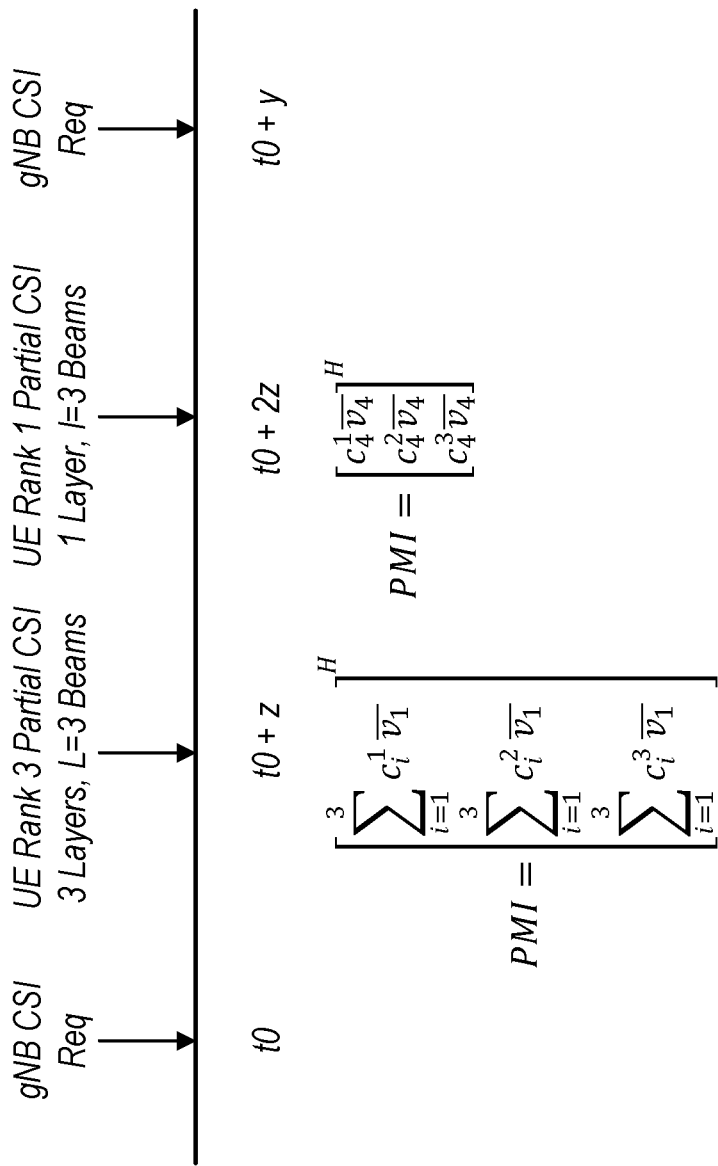
FIG. 18 illustrates type II CSI precoding overhead reduction via beam splitting over time, according to some embodiments.

FIGS. 17-18 Type II CSI Precoding Overhead Reduction Via Beam Splitting

FIG. 17 illustrates type II CSI precoding overhead reduction via beam splitting, according to some embodiments. Type II CSI overhead may be reduced by dividing CSI report information among multiple (e.g., 2 or 3, among various possibilities) CSI reports. For example, a CSI report for n layers and x beams may be split into two (e.g., complementary, partial) CSI reports: a first report (e.g., CSI1 or PMI1) with n layers and k beams and a second report (e.g., CSI2 or PMI2) with 1 layer and x-k beams. The k strongest beams may be selected for the first report; the weaker beams may be included in the second report. The second report may be constructed based on a rank 1 layer, e.g., including a single value for each parameter for each beam rather than including layer-specific values for each parameter for each beam. In other words, the first CSI report may contain feedback on rank r layers and k beams while the second report may be limited to a rank 1 layer. For both CSI reports the UE may report the same rank (e.g., as shown, the UE may report the rank in both reports, even though the second report may only include values for a single layer) and based on the same channel.

In some embodiments, CQI may be made pessimistic on the first report and optimistic/realistic on the second report. In other words, when the BS does not have the full beam information (e.g., the first report provides only partial PMI information), a UE may report (e.g., slightly) lower CQI to keep the potentially higher bit error rate (BER) and/or block error rate (BLER) in check due to the lack of full beam information at BS. For example, a BS may control the BER/BLER by adjusting the modulation and coding scheme (MCS) scheduled. Thus, by reporting a lower CQI, the UE may cause the BS to schedule a more conservative MCS, thus mitigating a potentially negative impact on BER/BLER due to the incomplete PMI information in the first report. Subsequently once the full beam info is acquired by the BS (e.g., via the second report), UE can report the actual CQI.

Performance loss on the first report may be compensated by a better resolution beam on the second report. For example, in the case that k=1, the first report may provide relatively low spatial resolution (e.g., only including coefficients for a single, strongest beam). The second report may compensate by providing a higher spatial resolution (e.g., more beams). In other words, the BS may use the spatial resolution of the second report to compensate for the low spatial resolution of the first report, e.g., to approximate at least one coefficient omitted from the first report.

FIG. 18 illustrates type II CSI precoding overhead reduction via beam splitting over time, according to some embodiments. FIG. 18 may be compared to FIG. 16, e.g., the rank may be 3 and L may=4 beams. However, in the example of FIG. 18, the UE may apply beam splitting to reduce CSI overhead. As illustrated in FIG. 18, at a first time (t0) a base station (gNB) may transmit a CSI request. In some embodiments, the request may indicate that the UE should reduce overhead in reporting CSI, e.g., via beam splitting.

At a second time (t0+z), the UE may respond by transmitting a first (e.g., partial) CSI report using beam splitting (k=1). In the illustrated example, the first report may be based on rank 3 with L=3 beams (e.g., the strongest beam is represented for each of 3 layers for 3 total beams). Note that the coefficients are summed only over 3 layers rather than 4 (e.g., as in FIG. 17). The first report may be 550 bits, among various possibilities.

At a third time (t0+2z), the UE may transmit a second (e.g., partial) CSI report. The second partial report may complement the first partial CSI report, e.g., as described above with respect to FIG. 17. Thus, the UE may provide coefficients for only a single (e.g., rank 1) layer in the second report. However, it should be noted that the UE may still report rank 3 in the second report. The second report may also include values for L=3 beams, for that layer. Thus, as shown, the second report may include only the single layer (note that no summations are shown). The second report may be 194 bits, among various possibilities.

It should be noted that, although the illustrated example shows the transmission of the first and second reports at different times, this spacing in time is not required. The reports may be transmitted sequentially, concurrently, in reverse order, or with any desired spacing in time.

At a fourth time (t0+y) the base station (gNB) may transmit a second CSI request. At a later time (not shown), the UE may respond by transmitting one or more additional CSI reports. The additional report(s) may or may not reduce overhead via beam splitting (e.g., according to an indication(s) in the second CSI request, configuration of the UE, or based on other factors determined by the UE).

In some embodiments, this approach for overhead reduction may be somewhat similar to differential CSI feedback where in the number of beams required to be reported are split based on their coefficients along time domain. The net overhead may be reduced because each time domain report may require a smaller overhead due to a lower number of beams reported in a single report. However only a few kinds of beam splitting may result in reduced overhead. The UE may also make a choice to prioritize layers and beams on which it sees stronger energy. As explained above, a CSI report for n layers and x beams may be split into two reports: one with n layers and k beams first and another with 1 layer and x-k beams (across multiple layers). This beam reduction per report may result in overhead savings. Since PMI may be conditioned on the rank reported, UE may report two CSIs, both with the same highest rank for a given channel. UE may use a CSI report corresponding to the rank 1 for the second report. The performance loss due to the first report may be compensated by the subsequent second report which has more resolution for amplitude and phase for the next few beams.

Figure 19:
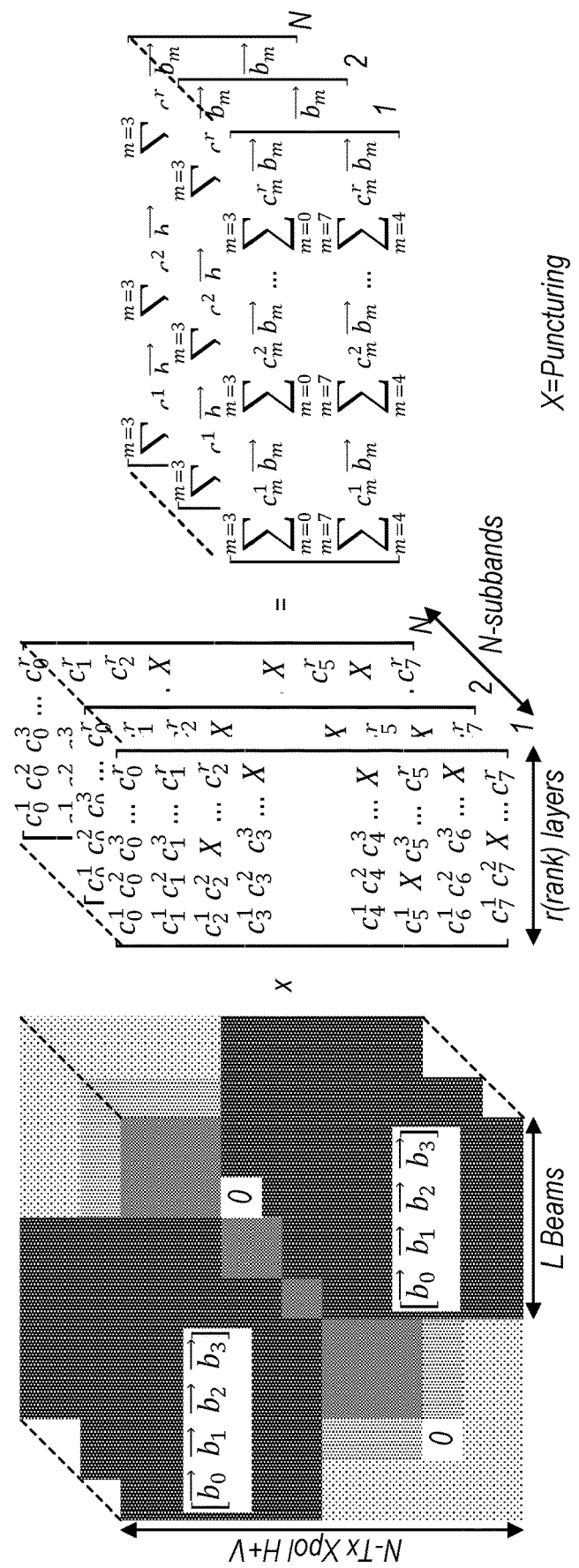
Figure 20:
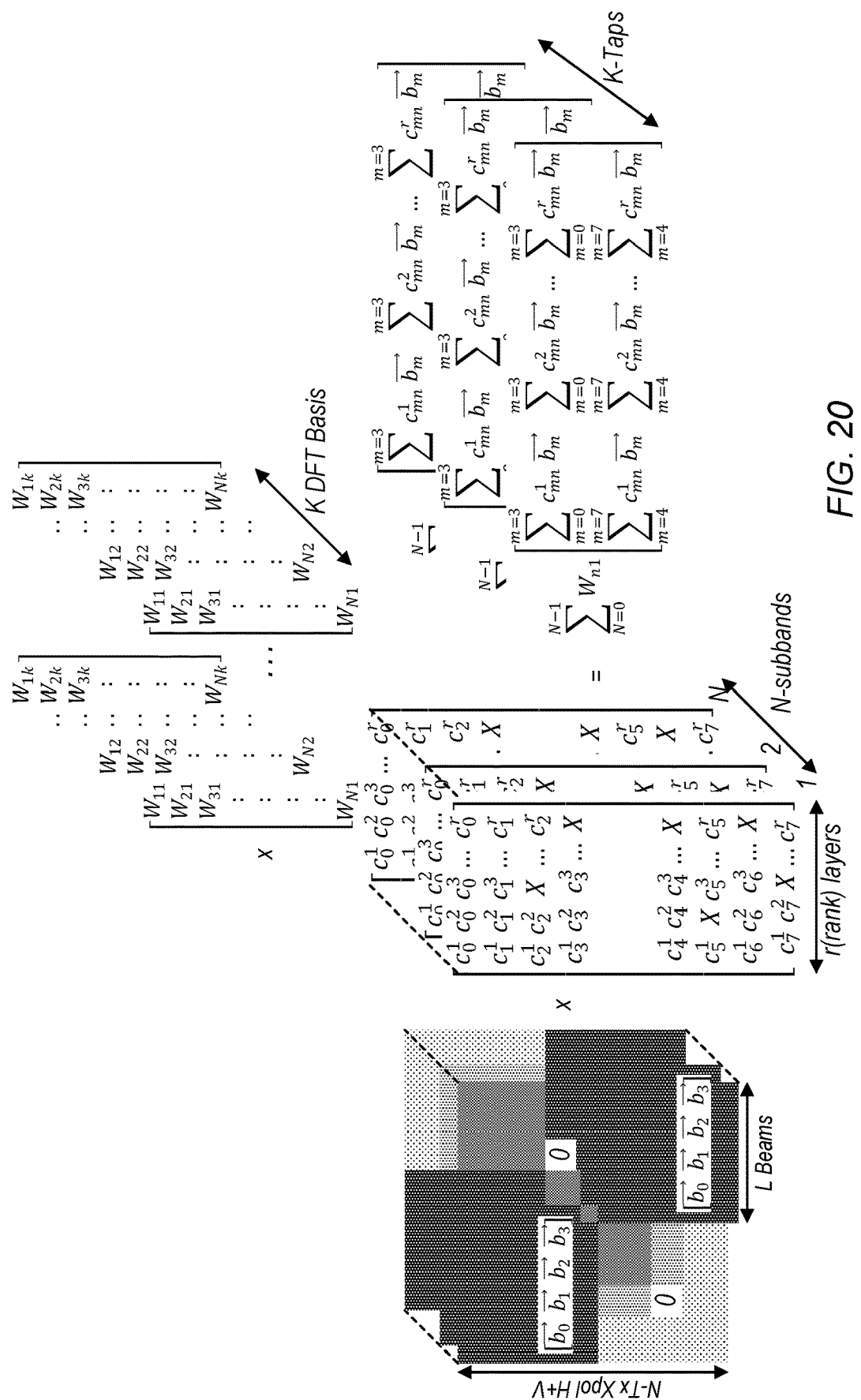

FIGS. 19-21—Type II CSI Precoding Overhead Reduction Via Layer Puncturing Across Orthogonal Layers FIGS. 19-21 illustrate type II CSI precoding overhead reduction via layer puncturing across orthogonal layers, according to some embodiments. The orthogonality of precoders across layers may be exploited to reduce overhead, e.g., by not reporting some coefficients (e.g., coefficients of some beams may not be reported, e.g., for any/all SBs). For higher ranks, the ideal direction of the beams may be along right singular vectors of a singular value decomposition (SVD) of channel H. Further, a precoder may use beams with right singular vectors of SVD of angular channel H, e.g., in order to minimize interference between layers. Right singular vectors of H may be the same as the Eigen vectors of a H*H which may not be defective, according to some embodiments. Therefore, the orthogonality of Eigen vectors may be used for puncturing layers per each SB. In other words, for each successive layer, coefficients for one additional beam may be omitted from a CSI report for all SBs.

FIG. 19 illustrates a type II CSI precoder using layer puncturing across orthogonal layers to achieve overhead reduction, according to some embodiments. FIG. 19 is similar to the precoder illustrated in FIG. 11. However, coefficients for some beams (e.g., over all SBs) are omitted (denoted by an X). It will be appreciated that the use of X in the notation does not indicate that the omitted coefficients are all the same (e.g., in many cases, they may be different); X may simply indicate that the value of these coefficients is omitted from the CSI report.

The number of omitted beams/coefficients may vary with layer. A first layer may include (e.g., in a CSI report) coefficients for all beams. A second layer may omit one beam. A third layer may omit coefficients for two beams, and so on. However, the omitted beams for one layer may be distinct from the beams omitted for other layers. For example, if a first beam is omitted from one layer, the first beam may be included for all other layers. It should be noted that the particular coefficients illustrated as omitted are exemplary only. The beams for which coefficients are omitted may be selected in any way (e.g., randomly, by configuration of the UE, based on an indication from the base station, set in a standard, based on values of the coefficients (e.g., strongest or weakest), etc.)

The layer puncturing technique may be adopted on top of frequency compression, e.g., as accepted for study for rank 1-2 UEs. The layer wise orthogonality may be exploited for pre- and post-DFT compression. FIG. 20 illustrates a type II CSI precoder using layer puncturing across orthogonal layers to achieve overhead reduction in combination with frequency compression, according to some embodiments. FIG. 20 is similar to the precoder illustrated in FIG. 19. However, FIG. 20 further illustrates that frequency SB reduction techniques can be applied independently. For example, assume the information across N-SBs can be adequately represented by K-taps due to frequency correlation after frequency domain compression. Thus, N SBs may be first frequency coded using DFT and K representative taps may be selected for reporting. For example, as shown, compression via layer puncturing may be performed in an N SB basis. Then, frequency compression can be applied in order to reduce to a K DFT basis. Thus, the precoder may be expressed as summations for each of the K taps in the DFT basis, e.g., rather than the N SBs of FIG. 19.

The base station (or receiver of the report) may be configured to determine the values of the omitted coefficients using the mathematical properties of orthogonality, e.g., as shown in FIG. 21. In other words, the receiver may exploit orthogonality of precoders across layers to reconstruct the missing coefficients (designated by X in FIGS. 19 and 20). The receiver may use the orthogonality of Eigen vectors for puncturing layers per each SB, e.g., using Gram-Schmidt Orthogonalization. Stated still differently, the receiver may use the system of equations to solve for the missing coefficients. Using the example of FIG. 19, all coefficients are included for layer 1. Thus, for layer 2 the receiver is able to solve the equations to determine the coefficients for the omitted beam, X, in layer 2. Each successive layer adds additional equations and additional unknowns so that the set of equations can be used to solve for all of the unknowns, X, in each layer. The layers may thus be solved sequentially. Thus, no complex mechanism is necessary to reconstruct the punctured (e.g., omitted) coefficients at the receiver, according to some embodiments.

FIG. 22 is a table illustrating the bit size of a CSI report using layer puncturing across orthogonal layers. Precoding with layer puncturing across orthogonal layers allows for overhead reduction to increase with the number of layers. Notably, the marginal bit size of the SB coefficients for each additional layer decreases by 40 bits. Thus, the relative reduction in bit size increases with the number of layers.

The following example may serve to further illustrate Layer wise puncturing with Gram Schmidt recovery. For transmissions with higher ranks {2,3,4}, ideal direction of the beams may be along the right singular vectors of a SVD channel (H). The right singular vectors may also be the Eigen vectors of channel covariance matrix (H*H). Since the covariance matrix is Hermitian and is bound to be non-defective, the Eigen vectors are orthogonal to each other.

For each SB, one or more coefficients in a linear combination of beams used to specify an Eigen vector (per layer) may be punctured within a CSI report. The orthogonality principle may be utilized at the gNB to reconstruct these punctured coefficients. The puncturing may be replicated or randomized across different SBs. A gNB may compute the punctured coefficients using the inner products of the reported coefficients. This may increase the computations on the gNB slightly but may be a simple method to reconstruct the beam directions when number of layers is more than 1 or spatial multiplexing may be use. In some embodiments, the procedure may not be adopted when the number of layers is 1 which is typically used for beam forming.

Given below may be a typical rank 2 type II SB precoder for i th SB, e.g., according to Release 15:

$$W(i) = \begin{bmatrix} [\vec{b}_0 \ \vec{b}_1 \ \vec{b}_2 \ \vec{b}_3] \begin{bmatrix} c_0^1 & c_0^2 \\ c_1^1 & c_1^2 \\ c_2^1 & c_2^2 \\ c_3^1 & c_3^2 \end{bmatrix} \\ [\vec{b}_0 \ \vec{b}_1 \ \vec{b}_2 \ \vec{b}_3] \begin{bmatrix} c_4^1 & c_4^2 \\ c_5^1 & c_5^2 \\ c_6^1 & c_6^2 \\ c_7^1 & c_7^2 \end{bmatrix} \end{bmatrix}$$

Where: $b_j$ are the same basis, $c_j^i$ is the coefficient for the j th beam(j<4) for i th layer across horizontal polarization while $c_j^i$ is the coefficient for the j th beam(j<4) for i th layer across vertical polarization. W(i) is the precoder for i th SB.

After layer puncturing the reported SB precoder may look like:

$$W(i) = \begin{bmatrix} [\vec{b}_0 \ \vec{b}_1 \ \vec{b}_2 \ \vec{b}_3] \begin{bmatrix} c_0^1 & c_0^2 \\ c_1^1 & c_1^2 \\ c_2^1 & c_2^2 \\ c_3^1 & c_3^2 \end{bmatrix} \\ [\vec{b}_0 \ \vec{b}_1 \ \vec{b}_2 \ \vec{b}_3] \begin{bmatrix} c_4^1 & c_4^2 \\ c_5^1 & c_5^2 \\ c_6^1 & c_6^2 \\ c_7^1 & c_7^2 \end{bmatrix} \end{bmatrix}$$

Where: X is the punctured coefficient which can take up to 4 bits per SB.

Since the puncturing may be done per layer and may be done per each SB, the net savings may be significant. The layer wise puncturing may be a type of spatial compression where the block diagonal structure of an angularly decomposed channel can be exploited. X may be recovered using the equation of FIG. 21 at the gnB. Layer-wise puncturing may be a technique that scales overhead reduction with the increase in number of layers.

Figure 23:
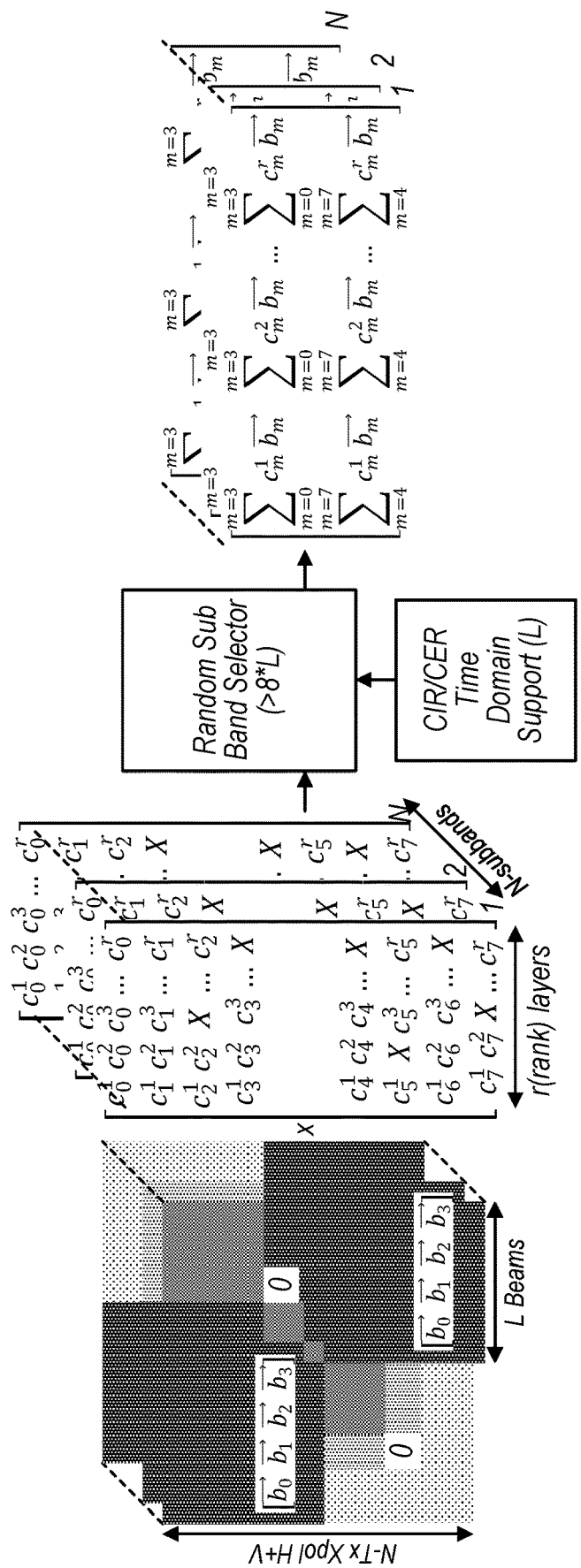
FIG. 23 illustrates type II CSI precoding overhead reduction via randomized SB compression, according to some embodiments.

FIG. 23—Type II CSI Precoding Overhead Reduction Via Randomized SB Compression

FIG. 23 illustrates a type II CSI precoder using randomized SB compression to achieve overhead reduction, according to some embodiments. FIG. 23 is similar to the precoders illustrated in FIGS. 11 and 19.

Sparsity in the time domain (e.g., as indicated by channel impulse response (CIR), channel energy response (CER), etc.) may be exploited to compress information in the frequency domain. Thus, a random subset of SBs may be selected for reporting, and the receiver (e.g., base station) may reconstruct the coefficients using compressed sensing (CS) theory and concepts. For example, the receiver may use thresholding, optimum matching pursuit (OMP), and/or basis pursuit (BP) to reconstruct omitted coefficients, among various possibilities. In other words, the receiver may solve for the sparsest solution (e.g., given that there may be more unknowns than equations, the receiver may perform a minimization/optimization to find the sparsest (e.g., most likely) solution).

A sparse signal of length N (e.g., equal to the number of SBs) with a number of spikes (e.g., non-zero coefficients) |T| in the time domain may be exactly reconstructed with O(c*|T|*log N) frequency domain measurements using l1 norm minimization (e.g., convex optimization) with high probability. The constant "c" may be independent of N and |T|. For example, for a 90% probability of (e.g., exact) reconstruction, typically >8*|T| frequency domain samples may be used, according to some embodiments. In other words, if the number of non-zero time domain coefficients for a SB is |T|, then 8*IT total frequency domain coefficients should be included in the report. A number of SBs to be compressed/omitted may be selected in order to provide 8*|T| coefficients. This may be referred to as providing 8× support. It will be appreciated that 8× support is exemplary only, and that other levels of support may be used as desired. For example, higher levels of support may be used to improve the probability of exact reconstruction. Lower levels of support may be used to further reduce the bit size of the CSI report.

In some embodiments, an $l_1$ norm of the signal may also be transmitted by the UE for faster (e.g., and/or more accurate) reconstruction of the compressed SBs at the receiver.

In order to encode type II CSI with random SB compression, a wireless device (e.g., a UE) may determine or obtain the CIR/CER at the wireless device. Based on the CIR/CER, the UE may determine the length of support (e.g., number of non-zero time domain coefficients |T|). The UE may then use the sparsity/length of support to (e.g., randomly) select a subset of SBs for reporting CSI. As noted above, the subset may provide approximately 8× support, among various possibilities.

Note that FIG. 23 illustrates coefficients of some beams being omitted (denoted by X) as discussed above with respect to FIGS. 19-22. It will be appreciated that although layer puncturing and randomized SB compression may be performed in conjunction, that either approach can also be performed individually.

Further, it will be appreciated that the SB compression illustrated in FIG. 23 is very different than existing techniques of compression in the spatial basis. For example, spatial compression as illustrated in part in FIG. 20 compresses the coefficients from all of the different beams to a K DFT basis. However, as shown in FIG. 20, all SBs are still used (e.g., summations from n=0 to N−1). In contrast, in FIG. 23 only a subset of the N SBs are included. Further, spatial compression and frequency (e.g., randomized SB) compression may be performed in conjunction.

Correlation across different SB coefficients can be used for SB compression. To exploit the correlation across SBs some transform coding may reduce the full number of SBs to a given number of principal SBs. If the response is to be reconstructed, additional feedback from the UE may be useful, e.g., regarding the basis and interpolation parameters. IDFT may be used to transform the frequency domain channel response to a time domain response which may be more likely to be sparse due to limited number of taps in time domain. However, this may incur loss if the position of the taps is not accurately estimated and if there is a mismatch owing to delays in reporting. Therefore, an approach which exploits time domain sparsity but which does not rely on accurate estimation of the channel taps may be useful. Also, the time domain coding may use simultaneous additional processing for each layer at the UE per each layer.

For this approach, random SB compression (e.g., compressed sensing) where the sparsity in time domain response for the channel may be exploited and only coefficients for (e.g., few, uniformly) randomly chosen SBs may be reported to the gNB while trading off with the complexity of reconstruction at gNB. Any complex signal made of |T| spikes may be recovered by convex programming by almost every set of frequencies of size $O(c|T|\log N)$ where N is the signal length with very high probability.

The response for the remaining SBs may be accurately reconstructed at gNB using convex optimization or basis pursuit approaches with a very high probability. Random SB compression may be sufficient to reconstruct a sparse channel.

For example, the algorithm may be developed in the following way: a UE may use a previously calculated channel impulse response or energy response to estimate the sparsity of the channel |T| across each layer and determine the number of frequencies/SBs $O(c|T|\log N)$ that are required for CSI reporting. The beam coefficients may be sent for these SBs and the rest of the SBs may be reconstructed at gNB using several signal processing techniques available in literature solvable in polynomial time. This way UE may not need to have a very accurate representation of the channel and an estimate of sparsity is sufficient while reporting CSI.

In some embodiments, random SB compression may result in perfect reconstruction of the frequency domain signal.

Further Information and Examples

The following example may further illustrate layer puncturing in combination with frequency compression. As long as N SB information may be reconstructed from K taps typically by interpolation etc techniques, the orthogonality across layers is preserved across all SBs. To prove this, consider a 2L by R by N SB matrix whose columns are represented by $c_n^r$ where $1 \leq r \leq R$ is the layer index and $0 \leq n \leq N-1$ is the SB index. Index x represents the number of beams and is irrelevant to the discussion. By ideal orthogonality across layers we can assume $$\langle \vec{c}_n^{i*}, \vec{c}_n^j \rangle = 0 \, \forall i \neq j \ldots$$

Also note that:

$$\langle \vec{c}_p^{i*}, \vec{c}_n^j \rangle \neq 0 \, \forall i,j \in \{1 \ldots R\} \& p,n \in \{1 \ldots N\} \quad \text{(Equation 1)}$$

We first compute the N-DFT of the SB coefficients for a layer s.

$$[\vec{c}_1^s \vec{c}_2^s \ldots \vec{c}_N^s][\vec{W}_1 \vec{W}_2 \ldots \vec{W}_N]$$

Where $W_n$ are the N-orthogonal DFT basis are represented as below.

$$[\vec{W}_1 \, \vec{W}_2 \, \ldots \, \vec{W}_N] = \begin{bmatrix} W_{11} & W_{12} & \ldots & W_{1N} \\ W_{21} & W_{22} & \ldots & W_{2N} \\ W_{31} & W_{32} & \ldots & W_{3N} \\ \vdots & \vdots & \ldots & \vdots \\ \vdots & \vdots & \ldots & \vdots \\ \vdots & \vdots & \ldots & \vdots \\ W_{N1} & W_{N2} & \ldots & W_{NN} \end{bmatrix}$$

From the orthogonality of the columns, one can derive the following equalities:

$$\begin{bmatrix} W_{11} & W_{12} & \ldots & W_{1N} \\ W_{21} & W_{22} & \ldots & W_{2N} \\ W_{31} & W_{32} & \ldots & W_{3N} \\ \vdots & \vdots & \ldots & \vdots \\ W_{N1} & W_{N2} & \ldots & W_{NN} \end{bmatrix} \begin{bmatrix} W_{11}^* & W_{21}^* & \ldots & W_{N1}^* \\ W_{12}^* & W_{22}^* & \ldots & W_{N2}^* \\ W_{13}^* & W_{23}^* & \ldots & W_{N3}^* \\ \vdots & \vdots & \ldots & \vdots \\ W_{1N}^* & W_{2N}^* & \ldots & W_{NN}^* \end{bmatrix} = I_N \quad \text{(Equation 2)}$$

$$\sum_{n=0}^{n=N-1} |W_{in}|^2 = 1 \quad \forall \, i = \{1, 2 \ldots N\}.$$

The cross product terms:

$$\sum_{n=0}^{n=N-1} W_{in} W_{jn}^* = 0 \, \forall i,j = \{1,2 \ldots N\}, i \neq j \quad \text{(Equation 3)}$$

Now the pre-coder after frequency compression can be written as:

$$\begin{bmatrix} \vec{c}_1^1 & \vec{c}_2^1 & \ldots & \ldots & \vec{c}_N^1 \\ \vec{c}_1^2 & \vec{c}_1^2 & \ldots & \ldots & \vec{c}_1^2 \\ \vdots & \vdots & \vdots & \vdots & \vdots \\ \vec{c}_1^R & \vec{c}_2^R & \ldots & \ldots & \vec{c}_N^R \end{bmatrix} \begin{bmatrix} W_{11} & W_{12} & \ldots & W_{1N} \\ W_{21} & W_{22} & \ldots & W_{2N} \\ W_{31} & W_{32} & \ldots & W_{3N} \\ \vdots & \vdots & \ldots & \vdots \\ \vdots & \vdots & \ldots & \vdots \\ W_{N1} & W_{N2} & \ldots & W_{NN} \end{bmatrix} =$$

$$\begin{bmatrix} \sum_{x=0}^{N-1} W_{x1} \vec{c}_x^1, & \sum_{x=0}^{N-1} W_{x2} \vec{c}_x^1, & \ldots & \ldots & \sum_{x=0}^{N-1} W_{xN} \vec{c}_x^1, \\ \sum_{x=0}^{N-1} W_{x1} \vec{c}_x^2, & \sum_{x=0}^{N-1} W_{x2} \vec{c}_x^2, & \ldots & \ldots & \sum_{x=0}^{N-1} W_{xN} \vec{c}_x^2, \\ \vdots & \vdots & \vdots & \vdots & \vdots \\ \sum_{x=0}^{N-1} W_{x1} \vec{c}_x^R, & \sum_{x=0}^{N-1} W_{x2} \vec{c}_x^R, & \ldots & \ldots & \sum_{x=0}^{N-1} W_{xN} \vec{c}_x^R, \end{bmatrix}$$

Consider the inner product across layers (rows i,j nth term):

$$\left(\left(\sum_{x=0}^{N-1} W_{xn} \vec{c}_x^i\right)^H \left(\sum_{y=0}^{N-1} W_{yn} \vec{c}_y^j\right)\right) \forall\, i \neq j$$

$$\Rightarrow |W_{xn}|^2 \left(\vec{c}_x^{iH}, \vec{c}_x^i\right) + \sum_{y=0, \forall x \neq y}^{N-1} W_{yn} \sum_{x=0}^{N-1} W_{xn}^* \left(\vec{c}_x^{iH}, \vec{c}_y^j\right)$$

First term goes to zero from orthogonality assumptions across layers from Equation 1 leaving the residual:

$$\sum_{y=0, \forall x \neq y}^{N-1} W_{yn} \sum_{x=0}^{N-1} W_{xn}^* \left(\vec{c}_x^{iH}, \vec{c}_y^j\right)$$

Now adding the terms across N coefficients SBs (columns of the pre-coded matrix) and considering Equation 3 above:

$$\sum_{n=0}^{N-1} \left\{\sum_{y=0}^{N-1} W_{yn} \sum_{x=0}^{N-1} W_{xn}^* \left(\vec{c}_x^{iH}, \vec{c}_y^j\right)\right\} = 0$$

Therefore, as long as the DFT basis vectors are orthogonal and same across all layers, orthogonality across layers may be exploited. If UE selects a set of K representative taps enabling frequency compression for reporting some interpolation may be done at the gNB to recover all frequency SBs. In some embodiments, all N taps may be available at gNB after interpolation, etc.

In order to perform layer domain compression, prior to selecting K taps puncture one coefficient incrementally across all taps, the precoding matrix may look like:

$$\begin{bmatrix} \sum_{x=0}^{N-1} W_{x1} \vec{c}_x^1 & \sum_{x=0}^{N-1} W_{x2} \vec{c}_x^1 & \cdots & \sum_{x=0}^{N-1} W_{xN} \vec{c}_x^1 \\ \sum_{x=0}^{N-1} W_{x1} & \sum_{x=0}^{N-1} W_{x2} & \cdots & \sum_{x=0}^{N-1} W_{xN} \\ \begin{bmatrix} \vec{c}_{x(1:2L-1)}^2 \\ 0 \end{bmatrix} & \begin{bmatrix} \vec{c}_{x(1:2L-1)}^2 \\ 0 \end{bmatrix} & \cdots & \begin{bmatrix} \vec{c}_{x(1:2L-1)}^2 \\ 0 \end{bmatrix} \\ \vdots & \vdots & \vdots & \vdots \\ \sum_{x=0}^{N-1} W_{x1} & \sum_{x=0}^{N-1} W_{x2} & \cdots & \sum_{x=0}^{N-1} W_{xN} \\ \begin{bmatrix} \vec{c}_{x(1:2L-1)}^R \\ 0 \end{bmatrix} & \begin{bmatrix} \vec{c}_{x(1:2L-1)}^R \\ 0 \end{bmatrix} & \cdots & \begin{bmatrix} \vec{c}_{x(1:2L-1)}^R \\ 0 \end{bmatrix} \end{bmatrix}$$

At the gNB, the zeros may be interpreted as unknowns. Interpolation followed by Inverse DFT is performed and subsequently equation (1) may be applied to recover the missing coefficients. As seen above a UE may incrementally zero out a beam coefficient across N SBs for a given layer prior to DFT compression, this may automatically reduce the size of the precoder from 2L×K coefficients to (2L-1)×K with savings K*(3 to 4 bits).

$$\begin{bmatrix} \sum_{x=0}^{N-1} W_{x1} \vec{c}_x^1 & \sum_{x=0}^{N-1} W_{x2} \vec{c}_x^1 & \cdots & \sum_{x=0}^{N-1} W_{xN} \vec{c}_x^1 \\ \sum_{x=0}^{N-1} W_{x1} & \sum_{x=0}^{N-1} W_{x2} & \cdots & \sum_{x=0}^{N-1} W_{xN} \\ \begin{bmatrix} \vec{c}_{x(1:2L-1)}^2 \\ 0 \end{bmatrix} & \begin{bmatrix} \vec{c}_{x(1:2L-1)}^2 \\ 0 \end{bmatrix} & \cdots & \begin{bmatrix} \vec{c}_{x(1:2L-1)}^2 \\ 0 \end{bmatrix} \\ \vdots & \vdots & \vdots & \vdots \\ \sum_{x=0}^{N-1} W_{x1} & \sum_{x=0}^{N-1} W_{x2} & \cdots & \sum_{x=0}^{N-1} W_{xN} \\ \begin{bmatrix} \vec{c}_{x(1:2L-1)}^R \\ 0 \end{bmatrix} & \begin{bmatrix} \vec{c}_{x(1:2L-1)}^R \\ 0 \end{bmatrix} & \cdots & \begin{bmatrix} \vec{c}_{x(1:2L-1)}^R \\ 0 \end{bmatrix} \end{bmatrix}$$

$$\begin{bmatrix} W_{11}^* & W_{21}^* & \cdots & W_{N1}^* \\ W_{12}^* & W_{22}^* & \cdots & W_{N2}^* \\ W_{13}^* & W_{23}^* & \cdots & W_{N3}^* \\ \vdots & \vdots & \cdots & \vdots \\ \vdots & \vdots & \cdots & \vdots \\ \vdots & \vdots & \cdots & \vdots \\ W_{1N}^* & W_{2N}^* & \cdots & W_{NN}^* \end{bmatrix}$$

The gNB can recover the missing coefficients across each SB by applying orthogonality post DFT decompression using equation (1) and solving for $X_1$:

$$\begin{bmatrix} \vec{c}_1^1 & \vec{c}_2^1 & \cdots & \vec{c}_N^1 \\ \begin{bmatrix} \vec{c}_{1(1:2L-1)}^r \\ X_1 \end{bmatrix} & \begin{bmatrix} \vec{c}_{1(1:2L-1)}^r \\ X_2 \end{bmatrix} & \cdots & \begin{bmatrix} \vec{c}_{1(1:2L-1)}^r \\ X_k \end{bmatrix} \\ \vdots & \vdots & \vdots & \vdots \end{bmatrix}$$

$$\left(\vec{c}_n^{j*}, \begin{bmatrix} \vec{c}_{1(1:2L-1)}^r \\ X_1 \end{bmatrix}\right) = 0 \quad \forall\, i \neq j$$

Thus, frequency compression and layer puncturing may be applied in combination as illustrated in FIG. 20.

In the following, exemplary embodiments are provided.

In some embodiments, a user equipment device (UE) may comprise: a radio; and a processing element operably coupled to the at least one radio and configured to cause the UE to: establish a connection with a base station; receive, from the base station, control information for reporting channel state information; perform one or more measurements; determine a method of encoding the channel state information with reduced overhead; generate, based on the one or more measurements and the method of encoding, at least one channel state information report; and transmit the at least one channel state information report to the base station.

In some embodiments, the method of encoding may comprise beam splitting, wherein at least one channel state information report includes a first report and a second report.

In some embodiments, the control information may specify a plurality of layers, wherein the first report includes each of the number of layers, wherein the second report includes only one of the number layers.

In some embodiments, the first report and the second report may each indicate a same rank, wherein the same rank is based on the number of layers.

In some embodiments, the control information may specify a plurality of beams, wherein the plurality of beams includes a number, x, of beams, wherein the first report includes a subset, k, of the plurality of beams, wherein the subset, k, of the plurality of beams includes the k strongest beams of the plurality of beams, wherein the second report includes x-k beams weaker than the k strongest beams.

In some embodiments, an apparatus for reporting channel state information of a user equipment device (UE), may comprise: a processing element configured to cause the UE to: establish a connection with a base station; receive, from the base station, control information, wherein the control information specifies: a plurality of layers including 3 or more layers; a plurality of L beams; and a plurality of N subbands; perform channel state measurements; dynamically select, based at least in part on the control information, at least one technique for reducing overhead associated with reporting channel state information; encode, based on the channel state measurements and the at least one technique for reducing overhead, a channel state information report; and transmit the channel state information report to the base station.

In some embodiments, the at least one technique for reducing overhead associated with reporting channel state information may include layer puncturing across orthogonal layers, wherein the channel state information report excludes coefficients for each subband of the plurality of N subbands for at least one beam of the plurality of L beams for at least one layer of the plurality of layers.

In some embodiments, the channel state information report includes coefficients for each subband of the plurality of N subbands for each beam of the plurality of L beams for a first layer of the plurality of layers, wherein the channel state information report excludes coefficients for each subband of the plurality of N subbands for one beam of the plurality of L beams for a second layer of the plurality of layers, wherein the channel state information report excludes coefficients for each subband of the plurality of N subbands for two beams of the plurality of L beams for a third layer of the number of layers.

In some embodiments, the one beam of the plurality of L beams may be distinct from the two beams of the plurality of L beams.

In some embodiments, the at least one technique for reducing overhead associated with reporting channel state information further includes randomized subband compression.

In some embodiments, the at least one technique for reducing overhead associated with reporting channel state information may include randomized subband compression, wherein the processing element is further configured to cause the UE to: randomly select a subset of the plurality of N subbands to include in the channel state information report.

In some embodiments, the processing element may be further configured to cause the UE to: exclude, from the channel state information report, all subbands that are not part of the subset.

In some embodiments, the channel state measurements include at least one of: channel impulse response (CIR); or channel energy response (CER), wherein the processing element is further configured to cause the UE to: determine the size of the subset based on the at least one of the CIR or CER.

In some embodiments, the processing element may be further configured to cause the UE to: transmit an l1 norm associated with the channel state information report to the base station.

In some embodiments, a method for managing a base station may comprise: at the base station: establishing a connection with a user equipment device (UE); transmitting, to the UE, control information for reporting channel state information, wherein the control information specifies: at least one technique for reducing overhead associated with reporting channel state information; a plurality of layers including 3 or more layers; a plurality of L beams; and a plurality of N subbands; receiving, from the UE, a first channel state information report according to the control information, wherein the channel state information report omits at least one coefficient; and interpreting the first channel state information report according to the at least one technique for reducing overhead associated with reporting channel state information.

In some embodiments, the at least one technique for reducing overhead associated with reporting channel state information may include beam splitting, wherein the method further comprises: receiving, from the UE, a second channel state information report according to the control information, wherein the second channel state information report includes a higher spatial resolution than a first spatial resolution of the first channel state information report.

In some embodiments, the first channel state information report may be received at a first time and the second channel state information report is received at a second time, wherein said interpreting may include using the higher spatial resolution of the second report to approximate the at least one coefficient.

In some embodiments, the at least one technique for reducing overhead associated with reporting channel state information may include layer puncturing across orthogonal layers, wherein said interpreting includes using the orthogonality of Eigen vectors to solve a system of equations for the at least one coefficient.

In some embodiments, said interpreting may include sequentially solving systems of equations for at least a subset of the plurality of layers.

In some embodiments, the at least one technique for reducing overhead associated with reporting channel state information may include randomized subband compression, wherein said interpreting includes reconstructing the at least one coefficient using at least one of: thresholding; optimum matching pursuit (OMP); or basis pursuit (BP).

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for managing a base station, the method comprising:
   at the base station:
      establishing a connection with a user equipment device (UE);
      transmitting, to the UE, control information for reporting channel state information, wherein the control information specifies:
         at least one technique for reducing overhead associated with reporting channel state information;
         a plurality of layers including 3 or more layers;
         a plurality of L beams; and
         a plurality of N subbands;
      receiving, from the UE, a first channel state information report according to the control information, wherein the first channel state information report omits at least one coefficient; and
      interpreting the first channel state information report according to the at least one technique for reducing overhead associated with reporting channel state information.

2. The method of claim 1,
   wherein the at least one technique for reducing overhead associated with reporting channel state information includes beam splitting,
   wherein the method further comprises: receiving, from the UE, a second channel state information report according to the control information, wherein the second channel state information report includes a higher spatial resolution than a first spatial resolution of the first channel state information report.

3. The method of claim 2,
   wherein the first channel state information report is received at a first time and the second channel state information report is received at a second time,
   wherein said interpreting includes using the higher spatial resolution of the second channel state information report to approximate the at least one coefficient.

4. The method of claim 1,
   wherein the at least one technique for reducing overhead associated with reporting channel state information includes a reduction of coefficients in a frequency domain.

5. The method of claim 1,
   wherein the at least one technique for reducing overhead associated with reporting channel state information includes a reduction of coefficients for at least one layer of the plurality of layers.

6. The method of claim 1,
   wherein the at least one technique for reducing overhead associated with reporting channel state information includes a reduction of coefficients for at least one beam of the plurality of L beams.

7. An apparatus, comprising:
   a processor configured to cause a user equipment device (UE) to:
      establish a connection with a base station;
      receive, from the base station, control information for reporting channel state information, wherein the control information specifies:
         at least one technique for reducing overhead associated with reporting channel state information;
         a plurality of layers including 3 or more layers;
         a plurality of L beams; and
         a plurality of N subbands; and
      transmit, to the base station, a first channel state information report according to the control information, wherein the first channel state information report omits at least one coefficient.

8. The apparatus of claim 7, wherein the at least one technique for reducing overhead associated with reporting channel state information includes a reduction of coefficients in a frequency domain.

9. The apparatus of claim 7, wherein the at least one technique for reducing overhead associated with reporting channel state information includes a reduction of coefficients for at least one layer of the plurality of layers.

10. The apparatus of claim 7, wherein the at least one technique for reducing overhead associated with reporting channel state information includes a reduction of coefficients for at least one beam of the plurality of L beams.

11. The apparatus of claim 7, wherein the at least one technique for reducing overhead associated with reporting channel state information includes beam splitting, wherein the processor is further configured to cause the UE to:
    transmit, to the base station, a second channel state information report according to the control information, wherein the second channel state information report includes a higher spatial resolution than a first spatial resolution of the first channel state information report.

12. The apparatus of claim 7, wherein the at least one technique for reducing overhead associated with reporting channel state information includes layer puncturing across orthogonal layers,
    wherein the first channel state information report excludes coefficients for each subband of the plurality of N subbands for at least one beam of the plurality of L beams for at least one layer of the plurality of layers.

13. The apparatus of claim 7, wherein the at least one technique for reducing overhead associated with reporting channel state information includes excluding at least one subband.

14. A user equipment device (UE), comprising:
    a radio; and
    a processor operably connected to the radio and configured to cause the UE to:
        establish a connection with a base station;
        receive, from the base station, control information for reporting channel state information, wherein the control information specifies:
            an indication of at least one technique associated with reporting channel state information, wherein the technique is associated with reduction of signaling for type II channel state information;
            a plurality of layers including 3 or more layers;
            a plurality of L beams; and
            a plurality of N subbands; and
        transmit, to the base station, a first channel state information report according to the control information, wherein the first channel state information report omits at least one coefficient.

15. The UE of claim 14, wherein the at least one technique associated with reporting channel state information includes a reduction of coefficients in a frequency domain.

16. The UE of claim 14, wherein the at least one technique associated with reporting channel state information includes a reduction of coefficients for at least one layer of the plurality of layers.

17. The UE of claim 14, wherein the at least one technique associated with reporting channel state information includes a reduction of coefficients for at least one beam of the plurality of L beams.

18. The UE of claim 14, wherein the at least one technique associated with reporting channel state information includes beam splitting, wherein the processor is further configured to cause the UE to:
    transmit, to the base station, a second channel state information report according to the control information, wherein the second channel state information report includes a higher spatial resolution than a first spatial resolution of the first channel state information report.

19. The UE of claim 14, wherein the at least one technique associated with reporting channel state information includes layer puncturing across orthogonal layers,
    wherein the first channel state information report excludes coefficients for each subband of the plurality of N subbands for at least one beam of the plurality of L beams for at least one layer of the plurality of layers.

20. The UE of claim 14, wherein the at least one technique associated with reporting channel state information includes excluding at least one subband.

* * * * *